US012620170B2

(12) United States Patent
Li et al.

(10) Patent No.: US 12,620,170 B2
(45) Date of Patent: May 5, 2026

(54) SPARSE VOXEL TRANSFORMER FOR CAMERA-BASED 3D SEMANTIC SCENE COMPLETION

(71) Applicant: NVIDIA Corporation, Santa Clara, CA (US)

(72) Inventors: Yiming Li, Jersey City, NJ (US); Zhiding Yu, Santa Clara, CA (US); Christopher B. Choy, Los Angeles, CA (US); Chaowei Xiao, Tempe, AZ (US); Jose Manuel Alvarez Lopez, Mountain View, CA (US); Sanja Fidler, Toronto (CA); Animashree Anandkumar, Pasadena, CA (US)

(73) Assignee: NVIDIA Corporation, Santa Clara, CA (US)

( * ) Notice: Subject to any disclaimer, the term of this patent is extended or adjusted under 35 U.S.C. 154(b) by 260 days.

(21) Appl. No.: 18/515,016

(22) Filed: Nov. 20, 2023

(65) Prior Publication Data

US 2024/0087222 A1     Mar. 14, 2024

Related U.S. Application Data

(60) Provisional application No. 63/426,497, filed on Nov. 18, 2022.

(51) Int. Cl.
*G06T 17/00* (2006.01)
*B60W 50/14* (2020.01)
(Continued)

(52) U.S. Cl.
CPC ............ *G06T 17/00* (2013.01); *B60W 50/14* (2013.01); *G06T 3/40* (2013.01); *G06V 10/44* (2022.01); *G06V 10/771* (2022.01); *G06V 10/82* (2022.01)

(58) Field of Classification Search
None
See application file for complete search history.

(56) References Cited

U.S. PATENT DOCUMENTS

2023/0326215 A1* 10/2023 Yu .......................... G06V 10/62
701/28

OTHER PUBLICATIONS

Song, S., et al., "Semantic scene completion from a single depth image," In Proceedings of the IEEE conference on computer vision and pattern recognition, pp. 1746-1754, 2017.
(Continued)

*Primary Examiner* — Peter Hoang
(74) *Attorney, Agent, or Firm* — Leydig, Voit & Mayer, Ltd.

(57) ABSTRACT

An artificial intelligence framework is described that incorporates a number of neural networks and a number of transformers for converting a two-dimensional image into three-dimensional semantic information. Neural networks convert one or more images into a set of image feature maps, depth information associated with the one or more images, and query proposals based on the depth information. A first transformer implements a cross-attention mechanism to process the set of image feature maps in accordance with the query proposals. The output of the first transformer is combined with a mask token to generate initial voxel features of the scene. A second transformer implements a self-attention mechanism to convert the initial voxel features into refined voxel features, which are up-sampled and processed by a lightweight neural network to generate the three-dimensional semantic information, which may be used by, e.g., an autonomous vehicle for various advanced driver assistance system (ADAS) functions.

18 Claims, 13 Drawing Sheets

(51) Int. Cl.

| | |
|---|---|
| *G06T 3/40* | (2024.01) |
| *G06V 10/44* | (2022.01) |
| *G06V 10/771* | (2022.01) |
| *G06V 10/82* | (2022.01) |

(56) References Cited

OTHER PUBLICATIONS

He, K., et al., "Masked autoencoders are scalable vision learners," In Proceedings of the IEEE/CVF Conference on Computer Vision and Pattern Recognition, pp. 16000-16009, 2022.

Cao, A.Q., et al., "Monoscene: Monocular 3D semantic scene completion," In Proceedings of the IEEE/CVF Conference on Computer Vision and Pattern Recognition, pp. 3991-4001, 2022.

Behley, J., et al., "SemanticKITTI: A dataset for semantic scene understanding of LiDAR sequences," In Proceedings of the IEEE/CVF International Conference on Computer Vision, pp. 9297-9307, 2019.

Roldao, L., et al., "LMSCNet: Lightweight multiscale 3D semantic completion," In 2020 International Conference on 3D Vision (3DV), pp. 111-119, 2020.

Cheng, R., et al., "S3CNet: A sparse semantic scene completion network for LiDAR point clouds," In Conference on Robotic Learning, pp. 2148-2161, PMLR, 2021.

Yan, X., et al., "Sparse single sweep LiDAR point cloud segmentation via learning contextual shape priors from scene completion," In Proceedings of the AAAI Conference on Artificial Intelligence, vol. 35, pp. 3101-3109, 2021.

Tulsiani, S., et al., "Multi-view supervision for single-view reconstruction via differentiable ray consistency," In Proceedings of the IEEE Conference on Computer Vision and Pattern Recognition, pp. 2626-2634, 2017.

Ummenhofer, B., et al., "DeMON: Depth and motion network for learning monocular stereo," In Proceedings of the IEEE Conference on Computer Vision and Pattern Recognition, pp. 5038-5047, 2017.

Xie, E., et al., "SegFormer:: Simple and efficient design for semantic segmentation with transformers," In Advances in Neural Information Processing Systems, vol. 34, pp. 12077-12090, 2021.

Long, J., et al., "Fully convolutional networks for semantic segmentation," In Proceedings of the IEEE Conference on Computer Vision and Pattern Recognition, pp. 3431-3440, 2015.

Noh, H., et al., "Learning deconvolution network for semantic segmentation," In Proceedings of the IEEE International Conference on Computer Vision (ICCV), Dec. 2015.

He, K., et al., Deep residual learning for image recognition, "In Proceedings of the IEEE Conference on Computer Vision and Pattern Recognition," pp. 770-778, 2016.

Carion, N., et al., "End-to-end object detection with transformers," In European Conference on Computer Vision, pp. 213-229, Springer, 2020.

Wang, Y., et al., "DETR3D: 3D object detection from multi-view images via 3D-to-2D queries," In Conference on Robot Learning, pp. 180-191, PMLR, 2022.

Xie, E., et al., "M2BEV: Multi-camera joint 3D detection and segmentation with unified birds-eye view representation," arXiv preprint arXiv:2204.05088, 2022.

Li, Z., et al., "BEVFormer: Learning birds-eye-view representation from multi-camera images viai spatiotemporal transformers," In European Conference on Computer Vision, 2022.

Zhu, X., et al., "Demformable DETR: Deformable transformers for end-to-end object detection," In International Conference on Learning Representations, 2020.

Vaswani, A.,, et al., "Attention is all you need," In Advances in neural information processing systems, vol. 30, 2017.

Ren, S., et al., "Faster R-CNN: Towards real-time object detection with region proposal networks," In Advances in Neural Information Processing Systems, vol. 28, 2015.

Bhat, S.F., et al., "AdaBins: Depth estimation using adaptive bins," In Proceedings of the IEEE/CVF Conference on Computer Vision and Pattern Recognition, pp. 4009-4018, 2021.

You, Y., et al., "Pseudo-LiDAR++: Accurate depth for 3D object detection in autonomous driving," In International Conference on Learning Representations, 2019.

Yuan, W., et al., "Neural window fully-connected CRFs for monocular depth estimation," In Proceedings of the IEEE Conference on Computer Vision and Pattern Recognition, 2022.

Shamsafar, F, et al., "MobileStereoNet: Towards lightweight deep networks for stereo matching," In Proceedings of the IEEE/CVF Winter Conference on Applications of Computer Vision, pp. 2417-2426, 2022.

\* cited by examiner

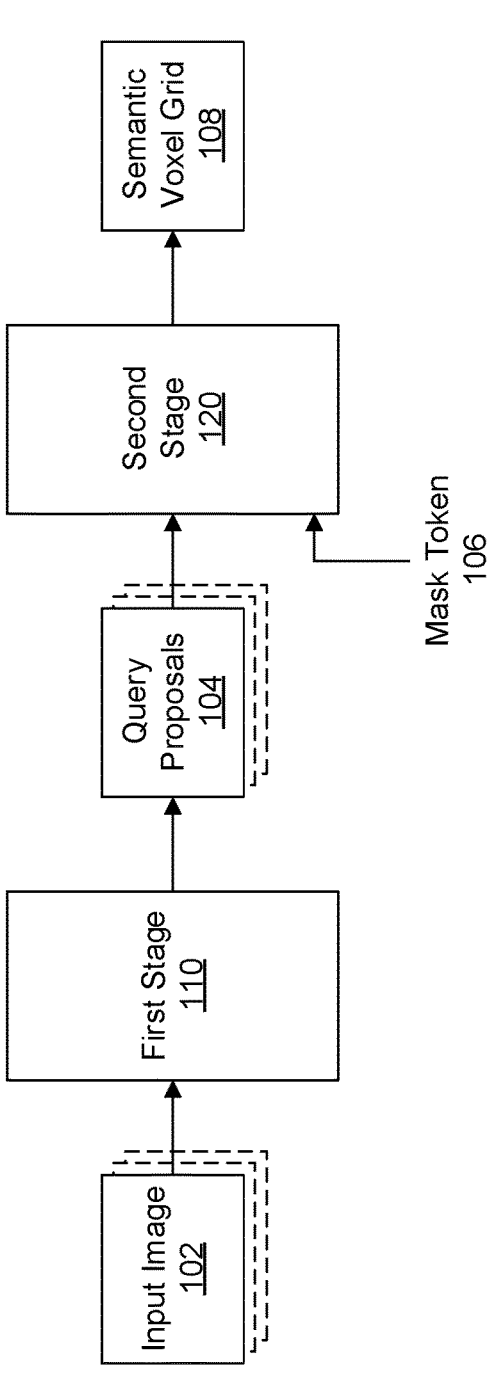
*Fig. 1A*

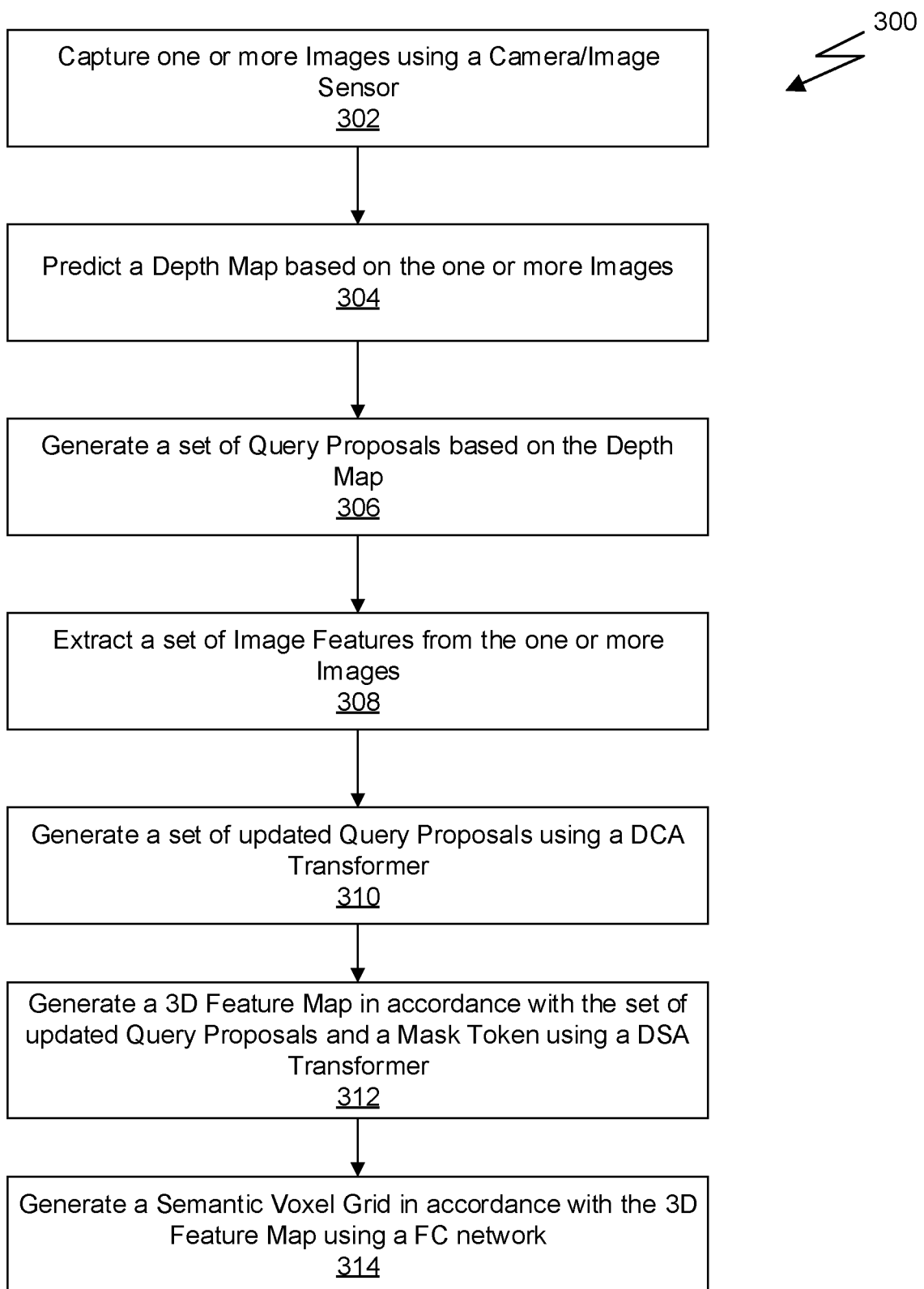

300

Capture one or more Images using a Camera/Image Sensor
302

Predict a Depth Map based on the one or more Images
304

Generate a set of Query Proposals based on the Depth Map
306

Extract a set of Image Features from the one or more Images
308

Generate a set of updated Query Proposals using a DCA Transformer
310

Generate a 3D Feature Map in accordance with the set of updated Query Proposals and a Mask Token using a DSA Transformer
312

Generate a Semantic Voxel Grid in accordance with the 3D Feature Map using a FC network
314

SPARSE VOXEL TRANSFORMER FOR CAMERA-BASED 3D SEMANTIC SCENE COMPLETION

CROSS-REFERENCE TO RELATED APPLICATIONS

This application claims priority to U.S. Provisional Patent Application No. 63/426,497, filed on Nov. 18, 2022, which is herein incorporated by reference in its entirety.

BACKGROUND

Humans can easily imagine the complete 3D geometry of occluded objects and scenes. This appealing feature in human perception is important for the strong capability of recognition and understanding. However, computer systems and, specifically, artificial intelligence do not have this innate ability. This ability may be particularly beneficial in autonomous vehicle (AV) perception systems to benefit downstream tasks such as planning and map reconstruction.

Obtaining accurate and complete 3D information in the real world can be difficult. The task is challenging due to a lack of sensing resolution and the incomplete observation due to limited field of view and occlusions. To tackle such tasks, semantic scene completion (SSC) has been proposed to infer the complete scene geometry and semantic features based on limited observations from sensors such as a camera and/or depth sensor. The SSC task has to perform two things well: (1) scene reconstruction of visible areas due to limited sensor resolution; and (2) scene hallucination of occluded or non-visible areas.

Most existing SSC solutions consider LiDAR as an additional modality to enable accurate 3D geometric measurement. However, LiDAR sensors are expensive and less portable while cameras are cheaper and provide richer visual cues of the driving scenes. This motivated the study of camera-based SSC solutions, as first proposed in the pioneering work of MonoScene as described in Cao et al., "Monoscene: Monocular 3D Semantic Scene Completion," Computer Vision and Pattern Recognition, p. 3991-4001 (2022), which is incorporated herein in its entirety. MonoScene lifts 2D image inputs to 3D using dense feature projection. However, such a projection inevitably assigns 2D features of visible regions to the empty or occluded voxels. For example, an empty voxel occluded by a car will still get the car's visual feature. As a result, the generated 3D features contain many ambiguities for subsequent geometric completion and semantic segmentation, resulting in unsatisfactory performance. Moreover, MonoScene requires a large number of parameters (~1.8 Gb) due to the 3D convolutional neural networks (CNNs) for processing 3D features. There is a need for addressing these issues and/or other issues associated with the prior art.

SUMMARY

Embodiments of the present disclosure relate to a sparse voxel transformer for camera-based 3D semantic scene completion. Systems and methods are disclosed that infer the complete scene geometry and semantics from limited observations using a 2D camera.

In accordance with a first aspect of the present disclosure, a method is disclosed for performing semantic scene completion. The method includes: receiving one or more input images; and processing, via a plurality of models implemented by one or more processors, the one or more input images to generate three-dimensional (3D) semantic information for the scene. Each image of the one or more input images is a two-dimensional (2D) image of a scene. The plurality of models includes at least one neural network to extract a set of image feature maps from the one or more input images and at least one transformer to convert the set of image feature maps into the three-dimensional semantic information.

In at least one embodiment of the first aspect, the processing, via the plurality of models, the one or more input images to generate three-dimensional semantic information for the scene comprises: generating a depth map, using a depth estimation network, by processing the one or more input images.

In at least one embodiment of the first aspect, the processing, via the plurality of models, the one or more input images to generate three-dimensional semantic information for the scene further comprises: generating 3D point cloud data based on the depth map; generating a first binary voxel grid occupancy map at a first resolution based on the 3D point cloud data; and converting, via a depth correction network, the first binary voxel grid occupancy map at the first resolution to a second binary voxel grid occupancy map at a second resolution that is lower than the first resolution.

In at least one embodiment of the first aspect, the processing, via the plurality of models, the one or more input images to generate three-dimensional semantic information for the scene further comprises: generating, via a query proposal network, a set of query proposals by processing at least one of the depth map or the second binary voxel grid occupancy map.

In at least one embodiment of the first aspect, the processing, via the plurality of models, the one or more input images to generate three-dimensional semantic information for the scene further comprises: processing, via a convolutional neural network (CNN), the one or more input images to generate the set of image features.

In at least one embodiment of the first aspect, the processing, via the plurality of models, the one or more input images to generate three-dimensional semantic information for the scene further comprises: processing, via a first transformer, the set of image features using a deformable cross-attention (DCA) mechanism in accordance with the set of query proposals to generate an updated set of query proposals.

In at least one embodiment of the first aspect, the processing, via the plurality of models, the one or more input images to generate three-dimensional semantic information for the scene further comprises: generating initial voxel features by combining the updated set of query proposals with a mask token; and processing, via a second transformer, the initial voxel features using a deformable self-attention (DSA) mechanism to generate refined voxel features.

In at least one embodiment of the first aspect, the processing, via the plurality of models, the one or more input images to generate three-dimensional semantic information for the scene further comprises: up-sampling the refined voxel features; and processing the up-sampled refined voxel features via a neural network comprising one or more fully connected layers to generate the three-dimensional semantic information.

In at least one embodiment of the first aspect, the plurality of models are trained in accordance with a loss criteria as defined by:

$$\mathcal{L} = -\Sigma_{k=1}^{K} \Sigma_{c=c_0}^{c_m} \boldsymbol{w}_c \hat{y}_{k,c} \log\left(\frac{e^{y_{k,c}}}{\Sigma_c e^{y_{k,c}}}\right),$$

where k is a voxel index, K is a total number of the voxels, c indexes a plurality of semantic classes, $y_{k,c}$ is a predicted logits for the k-th voxel belonging to class c, $\hat{y}_{k,c}$ is a k-th element of $\hat{Y}_t$; and $w_c$ is a weight for each class according to an inverse of a class frequency.

In at least one embodiment of the first aspect, the method further comprises: capturing, via an image sensor, the one or more input images.

In at least one embodiment of the first aspect, the image sensor is integrated in an autonomous vehicle. The method further comprises: performing at least one advanced driver assistance systems (ADAS) function based on the three-dimensional semantic information, wherein the at least one ADAS functions includes one or more of the following: emergency braking; pedestrian detection; collision avoidance; route planning; lane departure warning; or object avoidance.

In at least one embodiment of the first aspect, the at least one neural network includes a convolutional neural network (CNN) configured to process the one or more images to generate the set of image features, and the at least one transformer includes a first transformer configured to implement a deformable cross-attention mechanism and a second transformer configured to implement a deformable self-attention mechanism.

In accordance with a second aspect of the present disclosure, a system is disclosed for performing semantic scene completion. The system includes: a memory storing one or more input images, and one or more processors, connected to the memory. Each image of the one or more input images is a two-dimensional (2D) image of a scene. The one or more processors to: process, via a plurality of models implemented by one or more processors, the one or more input images to generate three-dimensional (3D) semantic information for the scene. The plurality of models includes at least one neural network to extract a set of image feature maps from the one or more input images and at least one transformer to convert the set of image feature maps into the three-dimensional semantic information.

In at least one embodiment of the second aspect, processing the one or more input images comprises: generating a depth map, using a depth estimation network, by processing the one or more input images; generating 3D point cloud data based on the depth map; generating a first binary voxel grid occupancy map at a first resolution based on the 3D point cloud data; converting, via a depth correction network, the first binary voxel grid occupancy map at the first resolution to a second binary voxel grid occupancy map at a second resolution that is lower than the first resolution; and generating, via a query proposal network, a set of query proposals by processing at least one of the depth map or the second binary voxel grid occupancy map.

In at least one embodiment of the second aspect, processing the one or more input images further comprises: processing, via a convolutional neural network (CNN), the one or more input images to generate the set of image features; processing, via a first transformer, the set of image features using a deformable cross-attention (DCA) mechanism in accordance with the set of query proposals to generate an updated set of query proposals; generating initial voxel features by combining the updated set of query proposals with a mask token; processing, via a second transformer, the initial voxel features using a deformable self-attention (DSA) mechanism to generate refined voxel features; up-sampling the refined voxel features; and processing the up-sampled refined voxel features via a neural network comprising one or more fully connected layers to generate the three-dimensional semantic information.

In at least one embodiment of the second aspect, the plurality of models are trained in accordance with a loss criteria as defined by:

$$\mathcal{L} = -\Sigma_{k=1}^{K} \Sigma_{c=c_0}^{c_m} \boldsymbol{w}_c \hat{y}_{k,c} \log\left(\frac{e^{y_{k,c}}}{\Sigma_c e^{y_{k,c}}}\right),$$

where k is a voxel index, K is a total number of the voxels, c indexes a plurality of semantic classes, $y_{k,c}$ is a predicted logits for the k-th voxel belonging to class c, $\hat{y}_{k,c}$ is a k-th element of $\hat{Y}_t$; and $w_c$ is a weight for each class according to an inverse of a class frequency.

In at least one embodiment of the second aspect, the system further comprises an image sensor. The one or more input images are captured by the image sensor.

In at least one embodiment of the second aspect, the system comprises an autonomous vehicle. The autonomous vehicle performs at least one advanced driver assistance systems (ADAS) function based on the three-dimensional semantic information. The at least one ADAS functions includes one or more of the following: emergency braking; pedestrian detection; collision avoidance; route planning; lane departure warning; or object avoidance.

In accordance with a third aspect of the present disclosure, a non-transitory computer-readable media is disclosed storing computer instructions that, responsive to being executed by one or more processors, cause a device to perform semantic scene completion. The instructions cause the device to: receive one or more input images, wherein each image of the one or more input images is a two-dimensional (2D) image of a scene; and process, via a plurality of models implemented by one or more processors, the one or more input images to generate three-dimensional (3D) semantic information for the scene, wherein the plurality of models includes at least one neural network to extract a set of image feature maps from the one or more input images and at least one transformer to convert the set of image feature maps into the three-dimensional semantic information.

In accordance with a third aspect of the present disclosure, processing the one or more input images comprises: generating a depth map, using a depth estimation network, by processing the one or more input images; generating 3D point cloud data based on the depth map; generating a first binary voxel grid occupancy map at a first resolution based on the 3D point cloud data; and converting, via a depth correction network, the first binary voxel grid occupancy map at the first resolution to a second binary voxel grid occupancy map at a second resolution that is lower than the first resolution; generating, via a query proposal network, a set of query proposals by processing at least one of the depth map or the second binary voxel grid occupancy map; processing, via a convolutional neural network (CNN), the one or more input images to generate the set of image features; processing, via a first transformer, the set of image features using a deformable cross-attention (DCA) mechanism in accordance with the set of query proposals to generate an updated set of query proposals; generating initial voxel features by combining the updated set of query proposals with a mask token; processing, via a second transformer, the initial voxel features using a deformable self-attention (DSA) mechanism to generate refined voxel features; up-sampling the refined voxel features; and processing the up-sampled refined voxel features via a neural network comprising one or more fully connected layers to generate the three-dimensional semantic information.

BRIEF DESCRIPTION OF THE DRAWINGS

The present systems and methods for a sparse voxel transformer for camera-based 3D semantic scene completion are described in detail below with reference to the attached drawing FIGS., wherein:

FIGS. 1A & 1B illustrates a transformer-based framework to generate a 3D representation of a 2D image, in accordance with some embodiments of the present disclosure;

FIG. 3 is a flowchart of a method 300 for estimating a dense semantic voxel grid based on a 2D image, in accordance with some embodiments;

DETAILED DESCRIPTION

A transformer-based framework for semantic scene completion (SSC) is described, where the goal is to jointly infer the complete scene geometry and semantics from limited observations (e.g., one or more two-dimensional images). Given a camera-based 2D image input, the system is able to produce 3D voxelized output that contains both the 3D geometry/occupancy information and the semantic class labels of each voxel.

In contrast to conventional systems, the transformer-based framework considers 3D-to-2D cross-attention to represent the sparse queries. The proposed design is motivated by two insights: (1) reconstruction-before-hallucination: the non-visible region's 3D information can be better completed using the reconstructed visible areas as starting points; and (2) sparsity in 3D-space: since a large volume of the 3D space is usually unoccupied, using a sparse representation instead of a dense one is certainly more efficient and scalable.

Embodiments of the present disclosure provide a two-stage framework that lifts images into a complete 3D voxelized semantic scene: a first stage comprising a query proposal network that generates reliable queries based on depth estimation; and a second stage comprising a sparse-to-dense transformer architecture that yields complete 3D scene representation and semantic class information.

Some embodiments of the present disclosure may be implemented as a computer method, which comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. However, this method may additionally or alternatively be executed by any one system, or any combination of systems, including, but not limited to, those described herein. Furthermore, persons of ordinary skill in the art will understand that any system that performs method is within the scope and spirit of embodiments of the present disclosure.

Figure 1B:
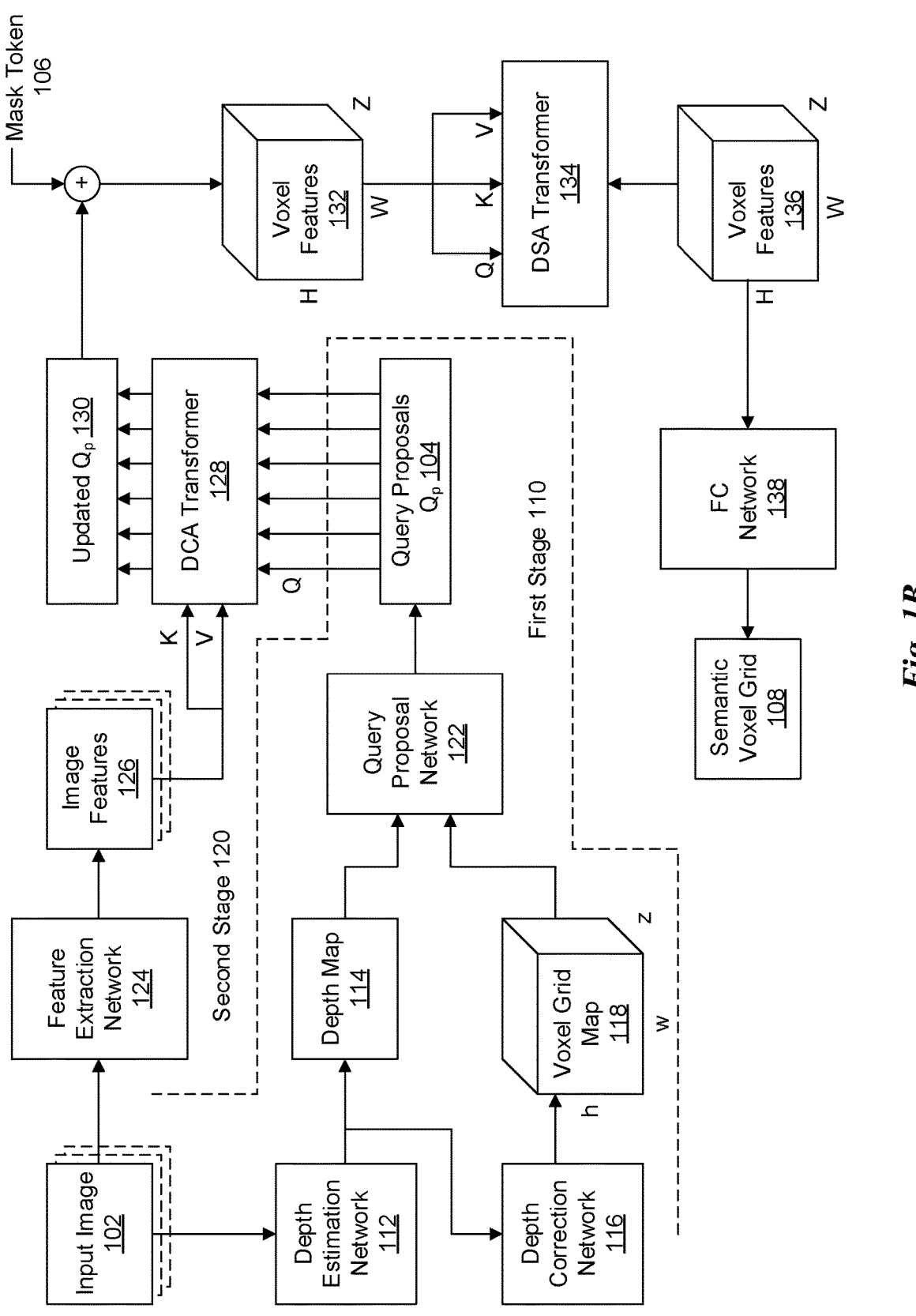

FIGS. 1A & 1B illustrates a transformer-based framework 100 to generate a 3D representation of a 2D image, in accordance with some embodiments of the present disclosure. The transformer-based framework 100 is configured to predict a dense semantic scene within a specific volume (e.g., a volume in front of an autonomous vehicle) based on one or more 2D images. The input to the transformer-based framework 100 includes one or more images $I_t = \{I_t, I_{t-1}, \ldots\}$ captured by a camera or image sensor. The output of the framework 100 is a voxel grid $Y_t \in \{c_0, c_1, \ldots, c_M\}^{H \times W \times Z}$ defined in a coordinate system at timestamp t, where each voxel is denoted by a semantic class $c_i$, where an empty voxel is denoted as class $c_0$.

A high-level abstraction of the transformer-based framework 100 is shown in FIG. 1A. In particular, one or more input images 102 are provided as input to a first stage 110 of the transformer-based framework 100, which processes the images 102 using a depth estimation network to generate a set of query proposals $Q_p$ 104. The query proposals $Q_p$ 104 estimate the location of objects that appear in the images 102 within a sparse binary voxel grid.

The second stage 120 of the transformer-based framework 100 also extracts a set of feature maps from the one or more images 102 using a deep neural network. A transformer extracts keys K and values V from the set of feature maps and processes them according to a query proposal $Q_p$ 104 using a cross-attention mechanism to generate a set of updated query proposals $\hat{Q}_p$. The updated query proposals $\hat{Q}_p$ and a mask token 106 are then used to populate a voxel feature map, which is further refined by a second transformer that implements a deformable self-attention mechanism to generate a dense voxel feature map. The dense voxel feature map is then up-sampled and processed by a light-weight fully-connected network to generate a dense semantic voxel grid 108 that assigns a semantic class to each voxel of a defined volume at a particular output space.

FIG. 1B shows the architecture of the transformer-based framework 100 in more detail. The framework 100 is implemented in two stages. In a first stage 110, one or more images are processed by a depth estimation network 112 to generate a depth map 114 corresponding to the input image $I_t$ captured at time t. It will be appreciated that the depth estimation network 112 can process the input image $I_t$ as well as one or more previous images ($I_{t-1}$, $I_{t-2}$, . . . ) to estimate the depth (e.g., z value) associated with each pixel (u,v) of image $I_t$.

In an embodiment, the depth map Z can be back-projected to generate a 3D point cloud in accordance with the following:

$$x = \frac{(u - c_u) \times z}{f_u}, \; y = \frac{(v - c_v) \times z}{f_v}, \; z = Z(u, v), \qquad \text{(Eq. 1)}$$

where ($c_u$, $c_v$) is the camera center, $f_u$ and $f_v$ are the horizontal and vertical focal lengths of the camera, and (u, v, z) are the 2.5D points given in the depth map Z(u,v). However, it will be appreciated that the resulting 3D point cloud has low quality, especially at areas farther from the camera, because the depth at the horizon is extremely inconsistent as only a few pixels are used to determine the depth of a large area.

In an embodiment, the depth estimation network 112 can be an existing depth estimation network, such as one described in Bhat et al., "AdaBins: Depth Estimation using Adaptive Bins," Computer Vision and Pattern Recognition, arXiv:2011,14141 (2020), which is incorporated by reference herein in its entirety. The network described in Bhat et al. includes a first stage encoder-decoder convolutional neural network (CNN) followed by a transformer-based architecture that divides the depth range into bins and adaptively estimates the depth center of each bin based on a monocular image. In another embodiment, the depth estimation network 112 can be configured to process a stereo image (e.g., from a left and right image sensor or stereo camera). An example stereo depth estimation network 112 is described in You et al., "Pseudo-lidar++: Accurate Depth for 3D Object Detection in Autonomous Driving," arXiv: 1906.06310 (2020), which is incorporated by reference herein in its entirety. Although the two examples provided above can be used as the depth estimation network 112, any model configured to estimate a 2.5D representation of an image (i.e., a 2D image of pixel values and corresponding depth values) can be implemented within the framework 100 as the depth estimation network 112.

In an embodiment, the framework 100 also includes a depth correction network 116, which predicts an occupancy map at a lower spatial resolution $M_{out} \in \{0,1\}^{h \times w \times z}$ to help correct the image depth estimates obtained above. More specifically, the point cloud generated above is converted into a binary voxel grid occupancy map $M_{in} \in \{0,1\}^{H \times W \times Z}$ at the higher resolution of H×W×Z, where each voxel is marked as 1 if occupied by at least one point of the point cloud or marked as 0 otherwise. The depth correction network 116 then converts the voxel grid occupancy map $M_{in}$ to the lower resolution voxel grid occupancy map $M_{out}$ 118, since a lower resolution is more robust to depth errors that may be included in voxel grid map $M_{in}$ and is still compatible with the resolution of voxel queries that will be performed in the second stage of the framework 100. In an embodiment, the depth correction network 116 is a lightweight encoder-decoder, UNet-based model, such as shown in or adapted from Roldao et al., Lmscnet: Lightweight Multiscale 3D Semantic Completion," 3D Vision, pp. 111-119 (2020), which is incorporated by reference herein in its entirety. For example, the depth correction network 116 can include a number of blocks, each block including one or more 2D convolution layers, 2D transpose convolution layers (in the case of the decoder-side of the network), pooling layers (e.g., max pooling layers), and/or concatenation layers for combining the output of a previous block with a skip connection from earlier blocks in the model.

Once the binary voxel grid occupancy map $M_{out}$ 118 is generated, a set of query proposals $Q_p$ 104 can be generated. A depth-based query proposal (1) limits the number of computations and memory bandwidth required by ignoring empty spaces as identified in the binary voxel grid occupancy map $M_{out}$ 118, and (2) reduces the complexity of the attention learning task by reducing ambiguities caused by erroneous 2D-to-3D correspondences. The set of query proposals $Q_p$ 104 are generated by a query proposal network 122 in accordance with the following:

$$Q_p = \text{Reshape}(Q[M_{out}]), \qquad \text{(Eq. 2)}$$

where $Q_p \in \mathbb{R}^{N_p \times d}$ is the set of query proposals to attend to image features in the second stage of the framework 100. In at least one embodiment, the query proposal network 122 is a CNN that processes at least one of the depth map 114 and/or the binary voxel grid map $M_{out}$ 118 to generate the set of query proposals $Q_p$ 104.

The set of query proposals $Q_p$ 104 is a subset of voxel queries, which are a cluster of pre-defined learnable parameters, where the subset of voxel queries is selected from the pre-defined cluster based on the binary values in the voxel grid occupancy map $M_{out}$ 118. The dimensionality of the query proposals $Q_p$ 104 should match that of set of the image features, as the query proposals $Q_p$ 104 are used to attend to the set of image features by the transformer network 128. Thus, while the voxel grid occupancy map $M_{out}$ 118 and the set of query proposals $Q_p$ 104 have similar dimensionality, the set of query proposals $Q_p$ 104 is not limited to binary values but instead includes a number of learnable parameters similar in format to parameters included in the set of image features.

In a second stage 120 of the framework 100, the original one or more input images 102 are separately processed by a feature extraction network 124 to generate a set of feature maps, which can be referred to as image features 126. The image features 126 may have a lower spatial resolution than the input images 102. Specifically, the spatial resolution of the image features 126 may be given as h×w, which matches the spatial resolution of the binary voxel grid occupancy map $M_{out}$ 118 in two dimensions. In at least one embodiment, the feature extraction network 124 is a deep CNN such as ResNet-50 as described in more detail in He et al., "Deep Residual Learning for Image Recognition," Computer Vision and Pattern Recognition, arXiv:1512.03385 (December 2015), which is herein incorporated by reference in its entirety. The feature extraction network 124 may be pre-trained using an existing training dataset to extract a number of features from the image(s) 102.

A transformer network 128 is applied to attend to the image features 126 based on the set of query proposals $Q_p$ 104 to learn rich visual features of the 3D scene. In an embodiment, the transformer network 128 utilizes a deformable cross attention (DCA) mechanism, which interacts with local regions of interest in the image features 126 and only samples $N_s$ points around a reference point to compute the attention results. Mathematically, each query proposal $Q_p$ 104 will be updated in accordance with the following equation:

$$DA(q, p, F) = \sum_{s=1}^{N_S} A_s W_s F(p + \delta p_s),$$ (Eq. 3)

Where p denotes the reference point, F represents the input features of the image, and s indexes the sampled point from a total of $N_s$ sample points; $W_s \in \mathbb{R}^{d \times d}$ denotes the learnable weights for value generation, $A_s \in [0,1]$ is the normalized attention weight generated by the dot product of projections of the query and the key; $\delta p_s \in \mathbb{R}^2$ is the predicted offset to the reference point p, and $F(p + \delta p_s)$ is the feature at location $p + \delta p_s$, extracted from image features 126 using bilinear interpolation.

For each proposed query $q_p$ in the set of query proposals $Q_p$ 104, a corresponding real-world location is obtained based on the voxel grid map 118 resolution of h×w×z and the real size of the interested 3D volume. Then, the obtained 3D point is projected onto the 2D image feature maps 126

$$F^{2D} = \{F_t^{2D}, F_{t-1}^{2D}, \dots \}.$$

It will be appreciated that the projected 2D point may not fall onto some image feature maps due to the limited field of view when obtaining the image. Consequently, the projected 2D points that falls onto (or hits) the image feature maps 126 can be regarded as the reference points p of the query $q_p$. Finally, a weighted sum of the sampled features is calculated as the output of the deformable cross-attention (DCA) transformer 128, as indicated below:

$$DCA(q_p, F^{2D}) = \frac{1}{|\mathcal{V}_t|} \sum_{t \in \mathcal{V}_t} DA(q_t, \mathcal{P}(p, t), F_t^{2D}),$$ (Eq. 4)

where $\mathcal{V}_t$ is the image features hit by the projected 2D point, t indexes the sets of hit images, and for each query proposal $q_p$ 104 located at p=(x,y,z), a camera projection function $\mathcal{P}$ (p,t) is used to obtain the reference point on image t. The output of the deformable cross-attention (DCA) transformer 128 can be referred to as the updated set of query proposals $\ddot{Q}_p$ 130.

To obtain the complete voxel features 132, the updated set of query proposals $\hat{Q}_p$ 130 is combined with a mask token m 106 to get the initial voxel features 132 $F^{3D} \in \mathbb{R}^{h \times w \times z \times d}$. A second transformer 134 that implements a deformable self-attention (DSA) mechanism is then utilized to get a refined set of voxel features 136 $\hat{F}^{3D} \in \mathbb{R}^{H \times W \times Z \times d}$, in accordance with the following:

$$DSA(F^{3D}, F^{3D}) = DA(f, p, F^{3D}),$$ (Eq. 5)

where f is a mask token 106 or an updated query proposal location $\hat{p}$=(x,y,z), p is a query proposal location p=(x,y,z), and $F^{3D}$ is the initial voxel features 132.

The refined voxel features 136 $\hat{F}^{3D}$ is then upsampled and projected to the output space by a lightweight fully connected network 138 to get a final semantic voxel grid 108 $Y_t \in \mathbb{R}^{H \times W \times Z \times (M+1)}$, where M+1 denotes M semantic classes with one empty class.

The framework 100 is trained end-to-end with a weighted cross-entropy loss. Specifically, the ground truth $\hat{Y}_t \in \{c_0, c_1, \dots, c_m\}^{H \times W \times Z}$ defined at time t represents a multi-class semantic voxel grid. Therefore, in at least one embodiment, the loss function can be computed in accordance with:

$$\mathcal{L} = -\sum_{k=1}^K \sum_{c=c_0}^{c_m} \mathcal{W}_c \hat{y}_{k,c} \log\left( \frac{e^{y_{k,c}}}{\sum_c e^{y_{k,c}}} \right),$$ (Eq. 6)

where k is the voxel index, K is the total number of the voxels, c indexes the semantic classes, $y_{k,c}$ is the predicted logits for the k-th voxel belonging to class c, $\hat{y}_{k,c}$ is the k-th element of $\hat{Y}_t$ and is a one-hot vector ($y_{i,k,c}$=1 if voxel k belongs to class c); and $\mathcal{W}_c$ is a weight for each class according to the inverse of the class frequency, similar to as described in Roldao et al.

Figure 2:
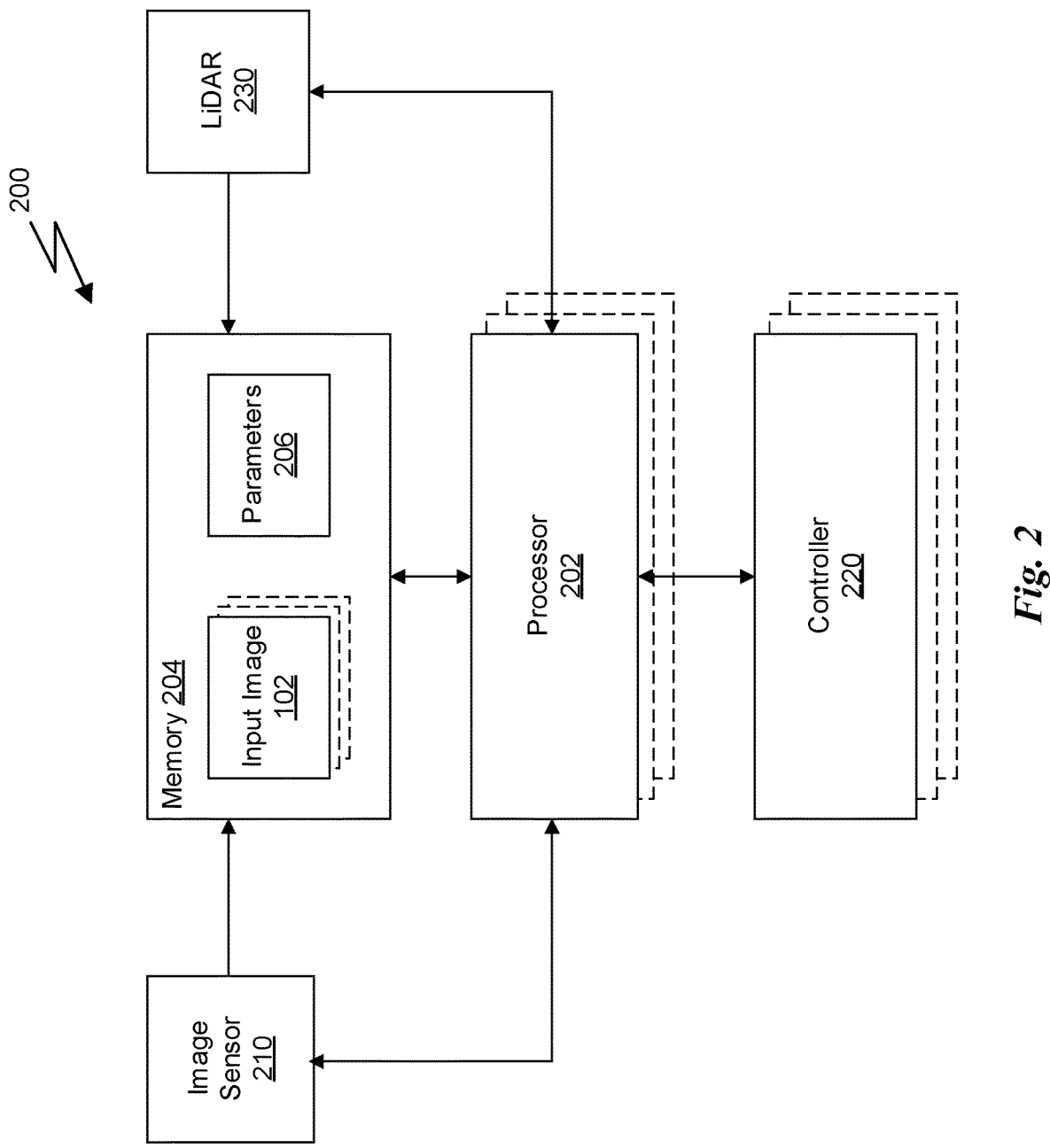
FIG. 2 illustrates an apparatus that utilizes the transformer-based framework of FIG. 1, in accordance with some embodiments.

FIG. 2 illustrates an apparatus 200 that utilizes the transformer-based framework 100 of FIG. 1, in accordance with some embodiments. It will be appreciated that the apparatus 200 may be a component or sub-system of a larger device such as an autonomous vehicle or robotic system. The components of the apparatus 200 shown in FIG. 2 may make up only a small portion of the total number of components of the larger device. Further, it will be appreciated that the components of the apparatus 200 may communicate with other components of the larger device to make use of the semantic voxel grid 108 to perform various tasks. For example, the apparatus 200 may be incorporated into an autonomous vehicle, such as autonomous vehicle described in further detail in FIGS. 7A-7B, which may use the semantic voxel grid 108 generated using the framework 100 in a number of related tasks including, but not limited to, emergency braking, pedestrian detection, collision avoidance, route planning, lane departure warning, traffic sign assist, intelligent headlamp control, or any other type of advanced driver assistance systems (ADAS) functions.

In at least one embodiment, the apparatus 200 includes one or more processors 202 in communication with a memory 204. The memory 204 may store parameters 206 to implement the framework 100. For example, the parameters 206 may include the various weights of the layers of the neural networks or transformers implemented within the framework 100. Although not shown explicitly, the memory 204 may also include various software (e.g., sets of instructions executable by at least one of the one or more processors 202) such as an operating system, firmware, applications, libraries, routines, sub-routines and the like.

The apparatus 200 may also include one or more sensors, including at least an image sensor 210. The image sensor 210 can include a complementary metal oxide semiconductor (CMOS) image sensor, a charge coupled device (CCD) image sensor, or the like. The image sensor 210 may be included in a digital camera assembly that includes optics, such as lens(es), beam splitters, and/or mirror(s); light source(s) (e.g., flash, infrared, etc.); a microcontroller, a local memory; and a communication interface such as a wired or wireless interface.

The image sensor 210 may be operated to capture one or more images 102 in a space around the apparatus 200. The image(s) 102 may be sampled and transmitted to the memory 204 for storage. At least one of the one or more processors 202 may read the image(s) 102 from the memory and process the image data to generate intermediate data produced by the one or more components (e.g., neural networks, transformers, etc.) of the framework 100. For example, at least one processor 202 may implement the depth estimation network 112 that is configured to predict a depth value for each pixel of an image 102 to generate the depth map 114. At least one other processor 202 may implement the feature extraction network 124 that is configured to predict the set of image feature maps 126 for the image 102.

In other embodiments, the one or more processors may be in communication with additional processors located in one or more remote devices, such as server devices located in a network such as a local area network (LAN) or wide area network (WAN) like the Internet. At least a portion of the framework 100 may be implemented in the server device(s), such as a server device configured to execute instructions that implement any of the neural networks and/or transformers described above. In yet other embodiments, the framework 100 may be at least partially implemented in a cloud architecture, where virtual machines and instantiated in various server devices and configured to implement the functions of the framework 100. In this manner, in some embodiments, the apparatus 200 may offload some of the processing to the server devices in the network or on the cloud. The output of the various models may then be transmitted back to the apparatus 200 and/or forwarded to other server devices for further processing within the framework 100. Ultimately, the apparatus 200 will receive the semantic voxel grid 108, which can be stored in the memory 204.

In some embodiments, the apparatus 200 includes one or more controllers 220, which may be used to perform various tasks or functions of the device. For example, each controller 220 may cause an actuator of the device to move, such as changing the throttle body state, engaging brake cylinders, changing the steering position, or the like. In the case where the device is an autonomous vehicle, the controllers 220 can include the various electronic control units (ECUs) located throughout the vehicle.

The apparatus 200 may also include additional sensors such as an auxiliary LiDAR (laser detection and ranging) sensor 230, inertial measurement units (IMUs), Global Positioning System (GPS) sensors, or the like. The LiDAR sensor 230 may use laser range finding techniques to detect the depth of objects visible to the image sensor 210. In an embodiment, the LiDAR sensor 230 may generate point cloud data of the volume proximate the sensor and store the point cloud data in the memory 204. In some embodiments, the LiDAR sensor 230 can be used to estimate the depth of the scene in lieu of the depth estimation network 112 and/or the depth correction network 116. In some embodiments, other sensors may be incorporated within the apparatus 200 in lieu of the LiDAR sensor 230. The other sensors may be used to perform the additional tasks that may make use of the semantic voxel grid 108. For example, a robot may include limit switches, Hall effect sensors, tactile pressure sensors, or the like that are used to detect interaction of the robot with the environment. The semantic voxel grid 108 can be used to classify the objects in a scene captured by the image sensor, and the robot can be programmed to pick up objects of a particular class. The additional sensors can be used for refined motion control algorithms to sense sufficient grip of an object as captured by the vision system.

In some embodiments, the apparatus 200, by executing a set of instructions on the one or more processors 202, is configured to capture one or more images using the image sensor 210, process the one or more images using the framework 100 to generate a semantic voxel grid 108, and use the semantic voxel grid 108 to control one or more tasks or perform some additional operation. For example, the semantic voxel grid 108 can be used by an obstacle avoidance algorithm of an autonomous vehicle that is designed to detect objects in the path of the vehicle or objects that have a potential to move into the path of the vehicle, and change the driving state of the vehicle according to a number of rules. The semantic voxel grid 108 is useful for predicting where objects may be, even if those objects may be fully or partially occluded within the frame of view of the image sensor 210. Any number of applications for using the semantic voxel grid 108 with a number of different types or classes of devices are contemplated as within the scope of the present disclosure.

FIG. 3 is a flowchart of a method 300 for estimating a dense semantic voxel grid based on a 2D image, in accordance with some embodiments. The method 300 may be implemented using any combination of software, firmware, and/or hardware, including by executing a set of instructions on one or more processors. The one or more processors can include a central processing unit (CPU) and/or one or more parallel processing units (PPUs), as described in more detail below.

At 302, one or more images are captured using an image sensor or digital camera. The images may be stored in a memory accessible by one or more processors.

At 304, a depth map is generated based on at least one of the one or more images. In an embodiment, a depth estimation network is used to predict a depth map associated with an image. In some embodiments, the depth map may be further processed by a depth correction network that generates a binary voxel grid occupancy map based on the depth map.

At 306, a set of query proposals is generated based on at least one of the depth map and/or the binary voxel grid occupancy map. In an embodiment, the set of query proposals are predicted using a CNN that processes at least one of the depth map and/or the binary voxel grid occupancy map to generate the set of query proposals.

At 308, a set of image features are extract from the one or more images. In an embodiment, the set of image features are extracted using a CNN such as ResNet-50, which is pre-trained using an existing training data set.

At 310, a set of updated query proposals is generated using a first transformer. The first transformer implements a deformable cross-attention mechanism that attends to keys and values generated from the set of image features using a query as defined by the query proposals. The output of the first transformer is a set of updated query proposals.

At 312, a 3D feature map is generated using a second transformer. Initial voxel features are generated by combining the updated query proposals with corresponding mask tokens. The initial voxel features are then refined using the second transformer to generate the 3D feature map (i.e., refined voxel features), which implements a self-attention mechanism. In other words, the query, key, and values for attention are all derived from the same input, the initial voxel features.

At 314, 3D semantic information (e.g., a semantic voxel grid) is generated in accordance with the 3D feature map. In an embodiment, the refined voxel features are up-sampled and converted to the output space using a lightweight fully connected network. The 3D semantic information may comprise a voxel representation with each voxel associated with a particular semantic class of a plurality of semantic classes.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

The following FIGS. illustrate example systems suitable for use in implementing at least some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the system is within the scope and spirit of embodiments of the present disclosure.

Parallel Processing Architecture

Figure 4:
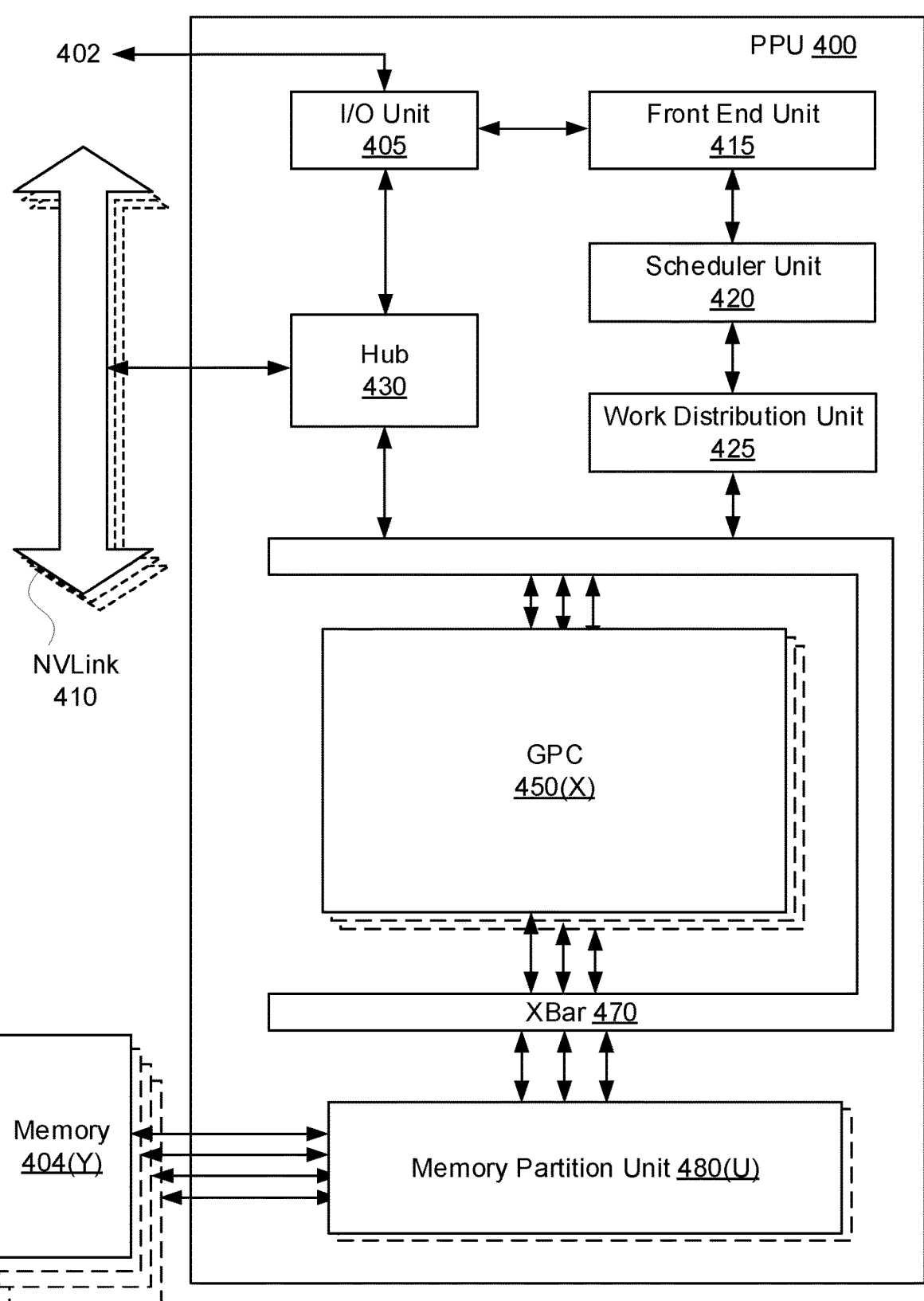
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the sparse voxel transformer for camera-based 3D semantic scene completion. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that conFIGS. the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
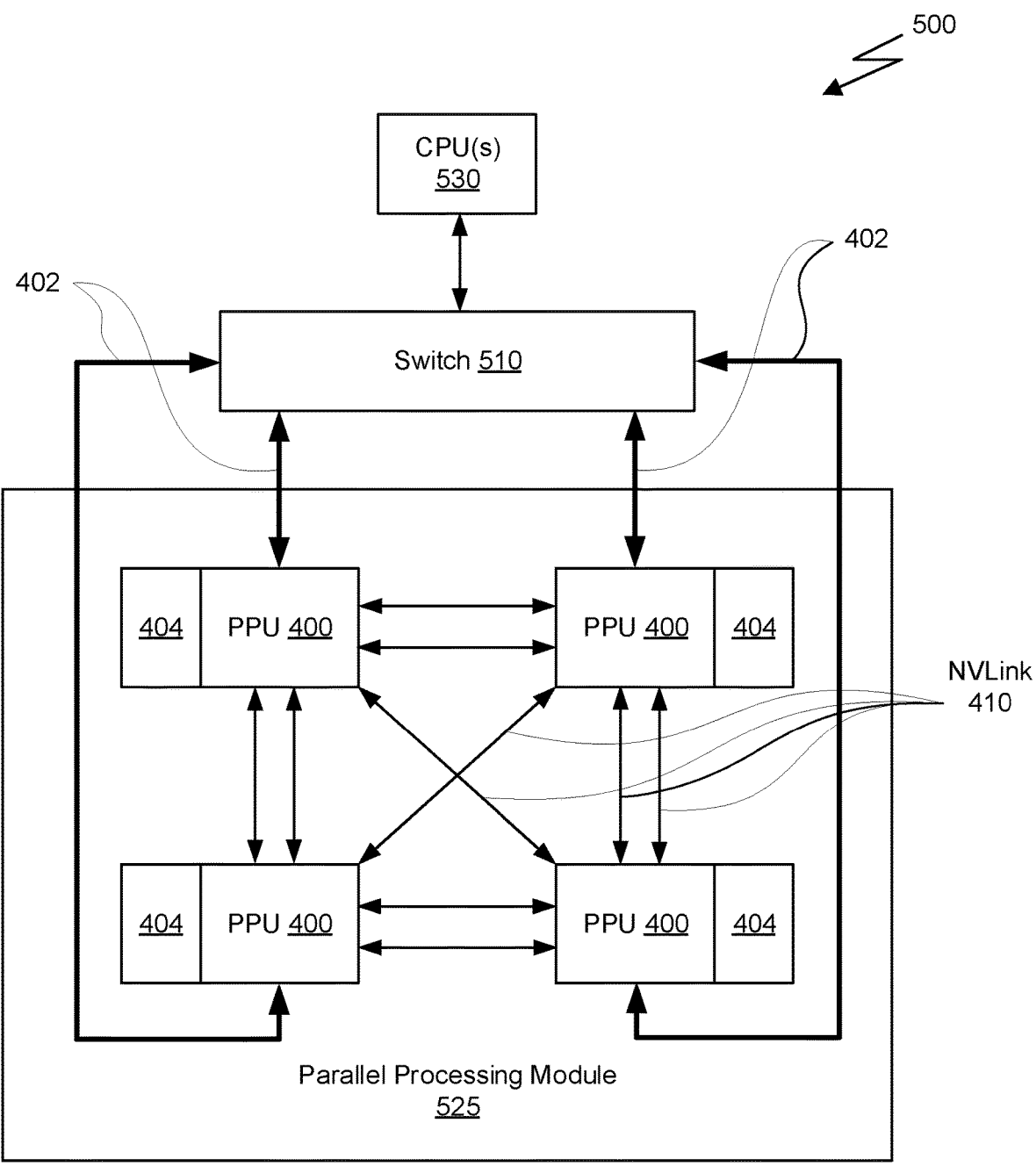
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the sparse voxel transformer for camera-based 3D semantic scene completion. The processing system 500 includes a CPU 530, switch 510, and multiple PPUs 400, and respective memories 404.

Figure 5B:
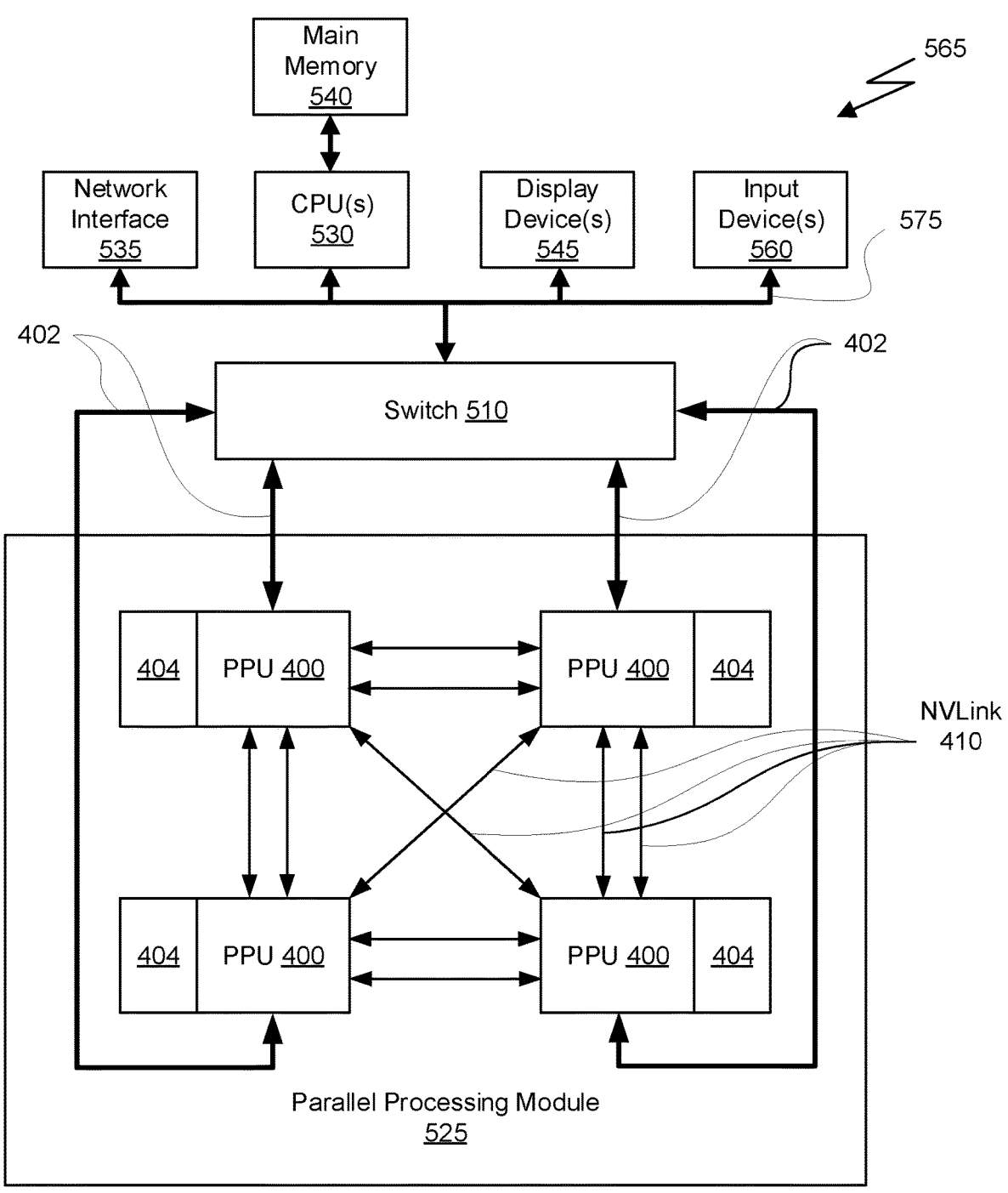
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the sparse voxel transformer for camera-based 3D semantic scene completion.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet,". ".client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
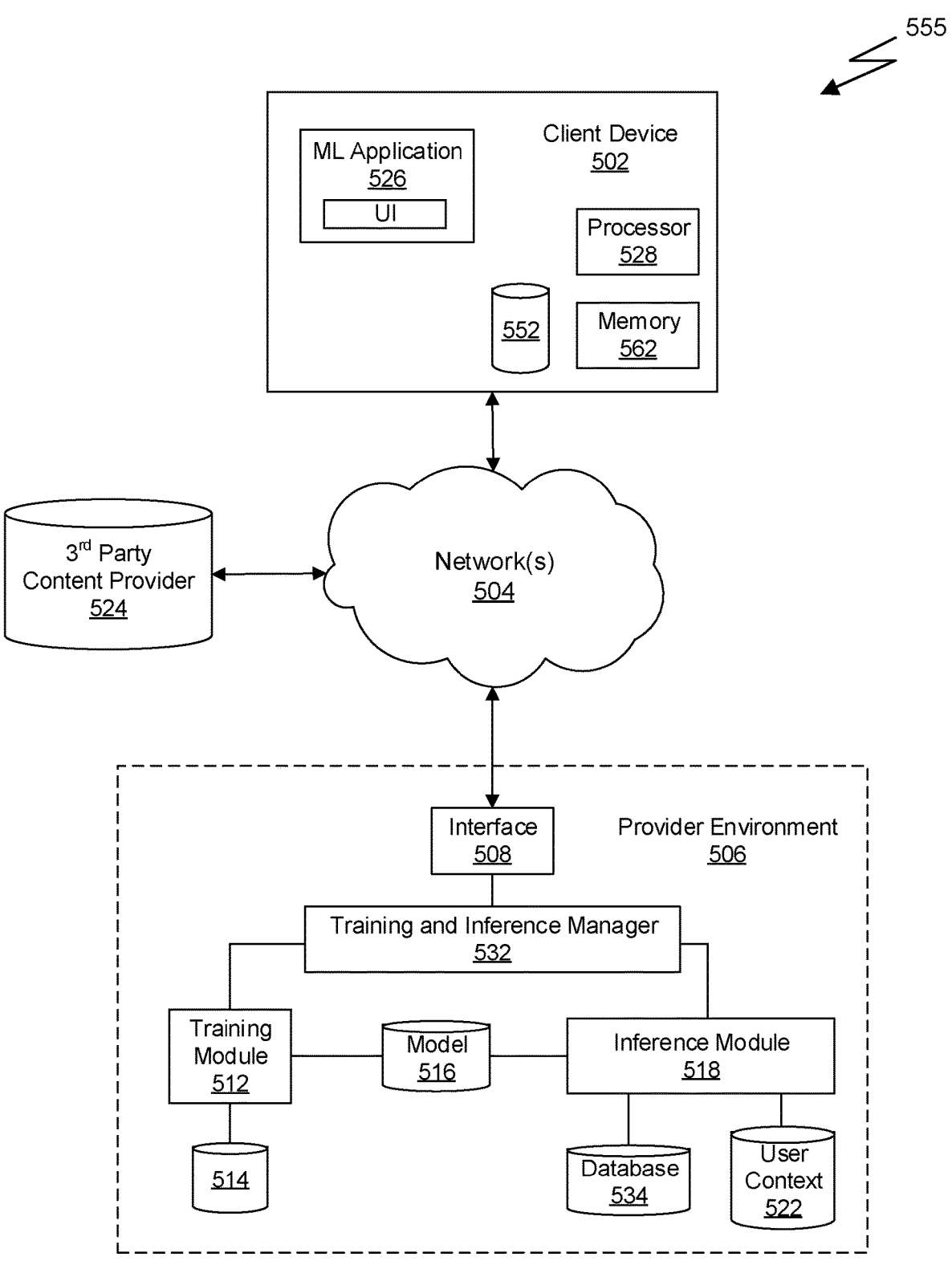
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Various programs may be executed within the PPU 400 in order to implement the various stages of the graphics processing pipeline. For example, the device driver may launch a kernel on the PPU 400 to perform a vertex shading stage on one processing unit (or multiple processing units). The device driver (or the initial kernel executed by the PPU 400) may also launch other kernels on the PPU 400 to perform other stages of the graphics processing pipeline, such as a geometry shading stage and a fragment shading stage. In addition, some of the stages of the graphics processing pipeline may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
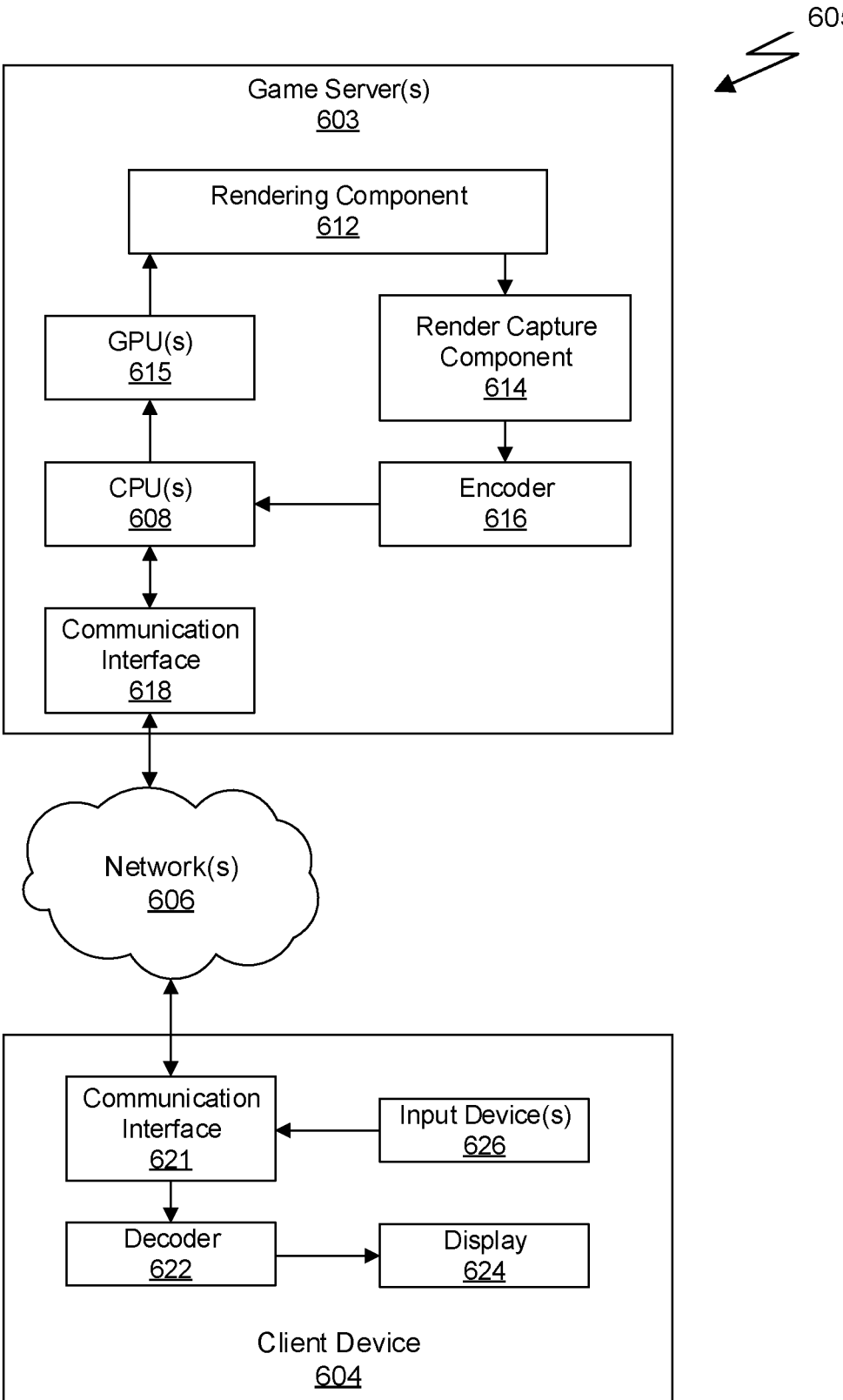
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604

(which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

Example Autonomous Vehicle

Figure 7A:
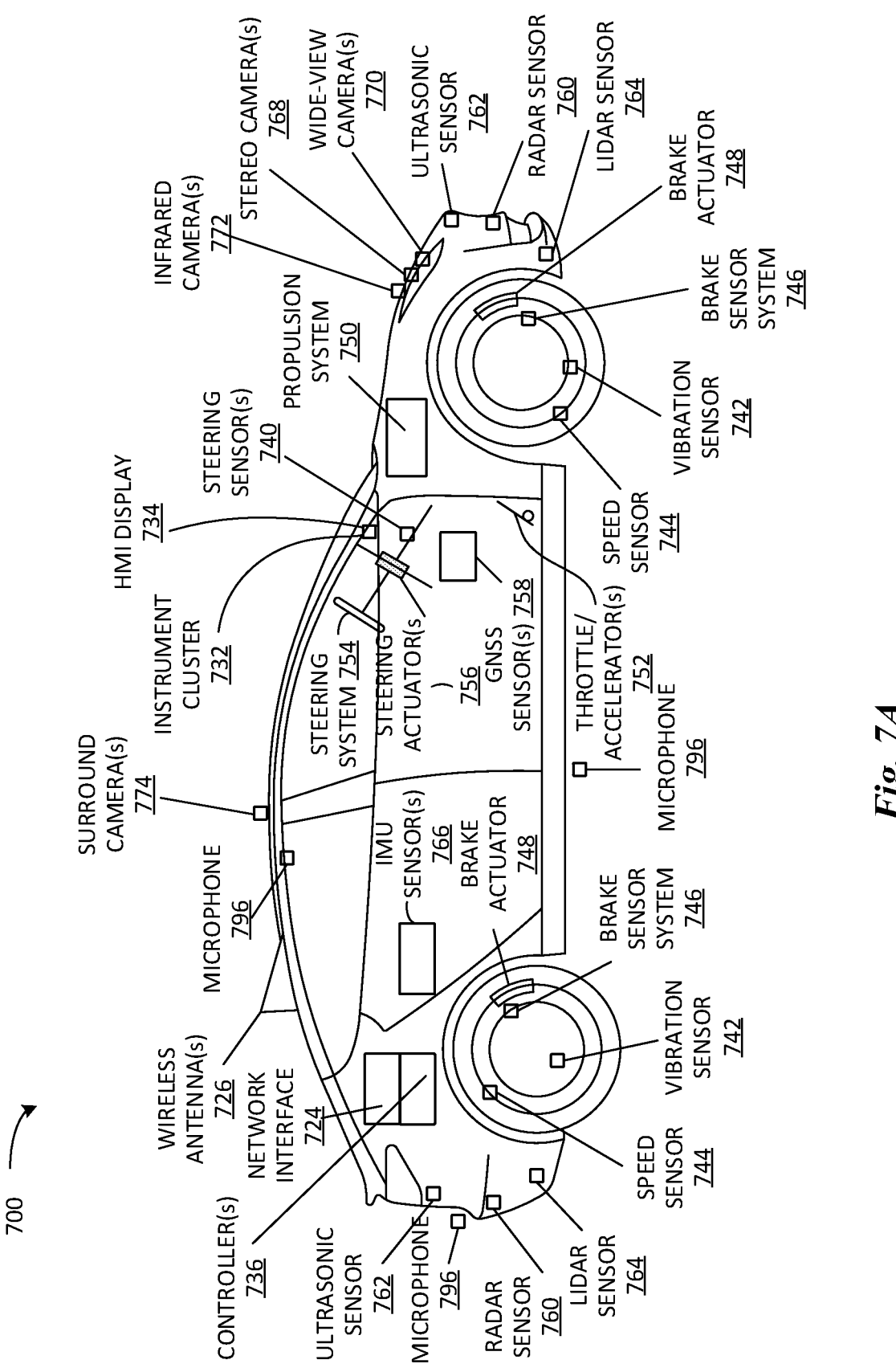
FIG. 7A illustrates an example of an autonomous vehicle, according to at least one embodiment.

FIG. 7A illustrates an example of an autonomous vehicle 700, according to at least one embodiment. In at least one embodiment, autonomous vehicle 700 (alternatively referred to herein as "vehicle 700") may be, without limitation, a passenger vehicle, such as a car, a truck, a bus, and/or another type of vehicle that accommodates one or more passengers. In at least one embodiment, vehicle 700 may be a semi-tractor-trailer truck used for hauling cargo. In at least one embodiment, vehicle 700 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 700 may be capable of functionality in accordance with one or more of Level 1 through Level 5 of autonomous driving levels. For example, in at least one embodiment, vehicle 700 may be capable of conditional automation (Level 3), high automation (Level 4), and/or full automation (Level 5), depending on embodiment.

In at least one embodiment, vehicle 700 may include, without limitation, components such as a chassis, a vehicle body, wheels (e.g., 2, 4, 6, 8, 18, etc.), tires, axles, and other components of a vehicle. In at least one embodiment, vehicle 700 may include, without limitation, a propulsion system 750, such as an internal combustion engine, hybrid electric power plant, an all-electric engine, and/or another propulsion system type. In at least one embodiment, propulsion system 750 may be connected to a drive train of vehicle 700, which may include, without limitation, a transmission, to enable propulsion of vehicle 700. In at least one embodiment, propulsion system 750 may be controlled in response to receiving signals from a throttle/accelerator(s) 752.

In at least one embodiment, a steering system 754, which may include, without limitation, a steering wheel, is used to steer vehicle 700 (e.g., along a desired path or route) when propulsion system 750 is operating (e.g., when vehicle 700 is in motion). In at least one embodiment, steering system 754 may receive signals from steering actuator(s) 756. In at least one embodiment, a steering wheel may be optional for full automation (Level 5) functionality. In at least one embodiment, a brake sensor system 746 may be used to operate vehicle brakes in response to receiving signals from brake actuator(s) 748 and/or brake sensors.

In at least one embodiment, controller(s) 736, which may include, without limitation, one or more system on chips ("SoCs") (not shown in FIG. 7A) and/or graphics processing unit(s) ("GPU(s)"), provide signals (e.g., representative of commands) to one or more components and/or systems of vehicle 700. For instance, in at least one embodiment, controller(s) 736 may send signals to operate vehicle brakes via brake actuator(s) 748, to operate steering system 754 via steering actuator(s) 756, to operate propulsion system 750 via throttle/accelerator(s) 752. In at least one embodiment, controller(s) 736 may include one or more onboard (e.g., integrated) computing devices that process sensor signals, and output operation commands (e.g., signals representing commands) to enable autonomous driving and/or to assist a human driver in driving vehicle 700. In at least one embodiment, controller(s) 736 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 736 provide signals for controlling one or more components and/or systems of vehicle 700 in response to sensor data received from one or more sensors (e.g., sensor inputs). In at least one embodiment, sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit ("IMU") sensor(s) 766 (e.g., accelerometer(s), gyroscope(s), a magnetic compass or magnetic compasses, magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range cameras (not shown in FIG. 7A), mid-range camera(s) (not shown in FIG. 7A), speed sensor(s) 744 (e.g., for measuring speed of vehicle 700), vibration sensor(s) 742, steering sensor(s) 740, brake sensor(s) (e.g., as part of brake sensor system 746), and/or other sensor types.

In at least one embodiment, one or more of controller(s) 736 may receive inputs (e.g., represented by input data) from an instrument cluster 732 of vehicle 700 and provide outputs (e.g., represented by output data, display data, etc.) via a human-machine interface ("HMI") display 734, an audible annunciator, a loudspeaker, and/or via other components of vehicle 700. In at least one embodiment, outputs may include information such as vehicle velocity, speed, time, map data (e.g., a High Definition map (not shown in FIG. 7A)), location data (e.g., vehicle's 700 location, such as on a map), direction, location of other vehicles (e.g., an occupancy grid), information about objects and status of objects as perceived by controller(s) 736, etc. For example, in at least one embodiment, HMI display 734 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 700 further includes a network interface 724 which may use wireless antenna(s) 726 and/or modem(s) to communicate over one or more networks. For example, in at least one embodiment, network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 726 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Logic is used to perform inferencing and/or training operations associated with one or more embodiments. Logic may refer to circuits included in one or more processors, such as the processors shown in FIG. 2. In at least one embodiment, logic may be used in vehicle 700 for inferencing or predicting operations based, at least in part, on weight parameters calculated using neural network training operations, neural network functions and/or architectures, or neural network use cases described herein.

Figure 7B:
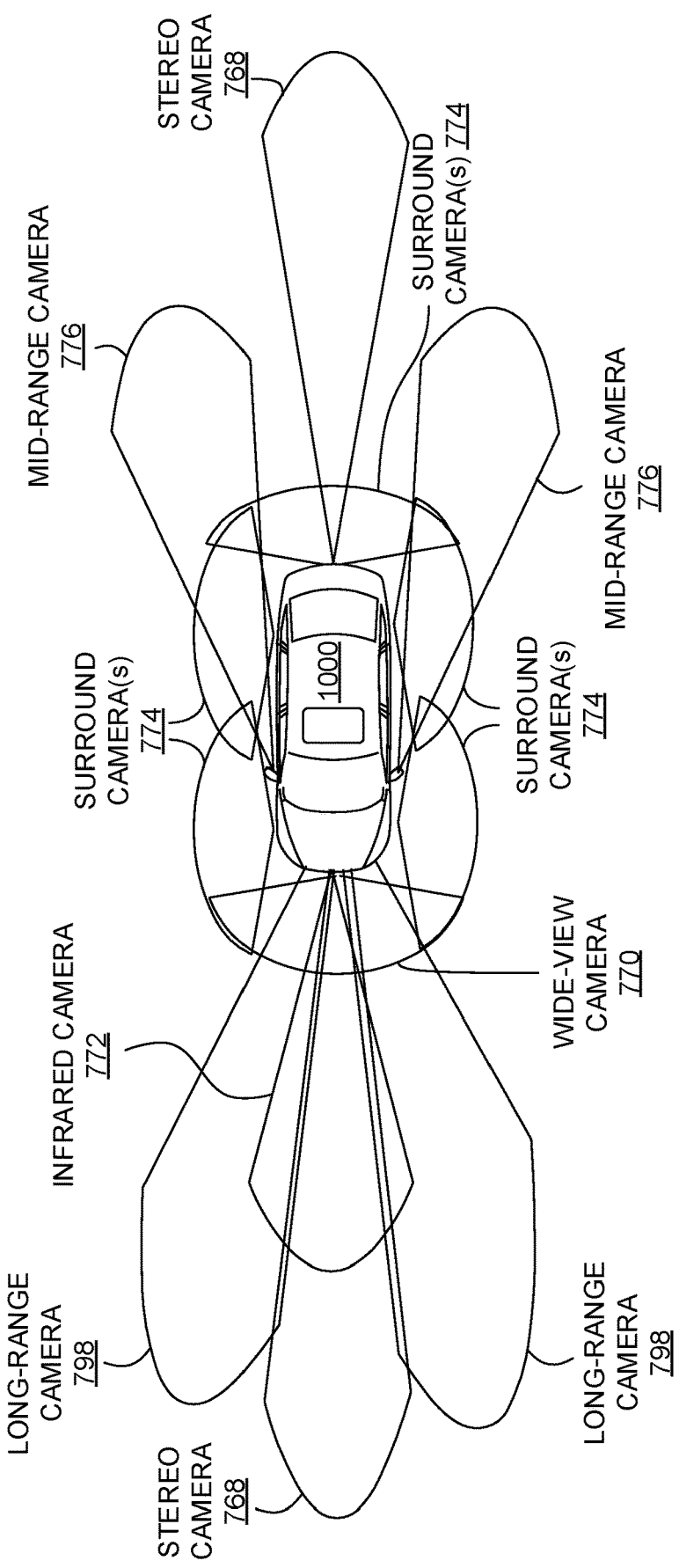
FIG. 7B illustrates an example of camera locations and fields of view for the autonomous vehicle of FIG. 7A, according to at least one embodiment.

FIG. 7B illustrates an example of camera locations and fields of view for autonomous vehicle 700 of FIG. 7A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 700.

In at least one embodiment, camera types for cameras may include, but are not limited to, digital cameras that may be adapted for use with components and/or systems of vehicle 700. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on the embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within vehicle 700 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 700 (e.g., front-facing cameras) may be used for surround view, to help identify forward facing paths and obstacles, as well as aid in, with help of one or more of controller(s) 736 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 770 may be used to perceive objects coming into view from a periphery (e.g., pedestrians, crossing traffic or bicycles). Although only one wide-view camera 770 is illustrated in FIG. 7B, in other embodiments, there may be any number (including zero) wide-view cameras on vehicle 700. In at least one embodiment, any number of long-range camera(s) 798 (e.g., a long-view stereo camera pair) may be used for depth-based object detection, especially for objects for which a neural network has not yet been trained. In at least one embodiment, long-range camera(s) 798 may also be used for object detection and classification, as well as basic object tracking.

In at least one embodiment, any number of stereo camera(s) 768 may also be included in a front-facing configuration. In at least one embodiment, one or more of stereo camera(s) 768 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 700, including a distance estimate for all points in an image. In at least one embodiment, one or more of stereo camera(s) 768 may include, without limitation, compact stereo vision sensor(s) that may include, without limitation, two camera lenses (one each on left and right) and an image processing chip that may measure distance from vehicle 700 to target object and use generated information (e.g., metadata) to activate autonomous emergency braking and lane departure warning functions. In at least one embodiment, other types of stereo camera(s) 768 may be used in addition to, or alternatively from, those described herein.

In at least one embodiment, cameras with a field of view that include portions of environment to sides of vehicle 700 (e.g., side-view cameras) may be used for surround view, providing information used to create and update an occupancy grid, as well as to generate side impact collision warnings. For example, in at least one embodiment, surround camera(s) 774 (e.g., four surround cameras as illustrated in FIG. 7B) could be positioned on vehicle 700. In at least one embodiment, surround camera(s) 774 may include, without limitation, any number and combination of wide-view cameras, fisheye camera(s), 360 degree camera(s), and/or similar cameras. For instance, in at least one embodiment, four fisheye cameras may be positioned on a front, a rear, and sides of vehicle 700. In at least one embodiment, vehicle 700 may use three surround camera(s) 774 (e.g., left, right, and rear), and may leverage one or more other camera(s) (e.g., a forward-facing camera) as a fourth surround-view camera.

In at least one embodiment, cameras with a field of view that include portions of an environment behind vehicle 700 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 798 and/or mid-range camera(s) 776, stereo camera(s) 768, infrared camera(s) 772, etc.) as described herein.

Figure 7C:
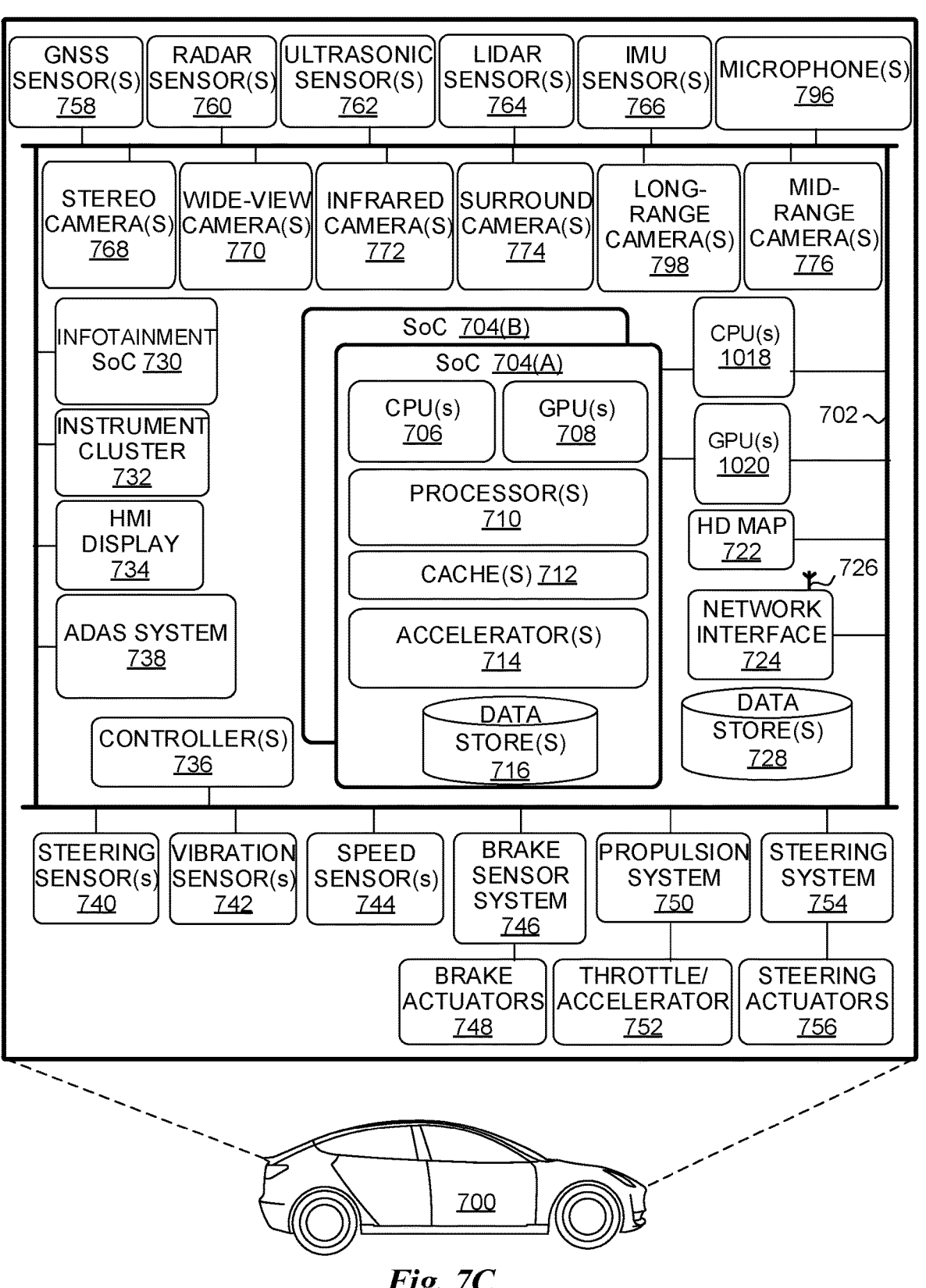
FIG. 7C is a block diagram illustrating an example system architecture for the autonomous vehicle of FIG. 7A, according to at least one embodiment.

FIG. 7C is a block diagram illustrating an example system architecture for autonomous vehicle 700 of FIG. 7A, according to at least one embodiment. In at least one embodiment, each of components, features, and systems of vehicle 700 in FIG. 7C is illustrated as being connected via a bus 702. In at least one embodiment, bus 702 may include, without limitation, a CAN data interface (alternatively referred to herein as a "CAN bus"). In at least one embodiment, a CAN may be a network inside vehicle 700 used to aid in control of various features and functionality of vehicle 700, such as actuation of brakes, acceleration, braking, steering, windshield wipers, etc. In at least one embodiment, bus 702 may be configured to have dozens or even hundreds of nodes, each with its own unique identifier (e.g., a CAN ID). In at least one embodiment, bus 702 may be read to find steering wheel angle, ground speed, engine revolutions per minute ("RPMs"), button positions, and/or other vehicle status indicators. In at least one embodiment, bus 702 may be a CAN bus that is ASIL B compliant.

In at least one embodiment, in addition to, or alternatively from CAN, FlexRay and/or Ethernet protocols may be used. In at least one embodiment, there may be any number of busses forming bus 702, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 702 may communicate with any of components of vehicle 700, and two or more busses of bus 702 may communicate with corresponding components. In at least one embodiment, each of any number of system(s) on chip(s) ("SoC(s)") 704 (such as SoC 704(A) and SoC 704(B)), each of controller(s) 736, and/or each computer within vehicle may have access to same input data (e.g., inputs from sensors of vehicle 700), and may be connected to a common bus, such CAN bus.

In at least one embodiment, vehicle 700 may include one or more controller(s) 736, such as those described herein with respect to FIG. 7A. In at least one embodiment, controller(s) 736 may be used for a variety of functions. In at least one embodiment, controller(s) 736 may be coupled to any of various other components and systems of vehicle 700, and may be used for control of vehicle 700, artificial intelligence of vehicle 700, infotainment for vehicle 700, and/or other functions.

In at least one embodiment, vehicle 700 may include any number of SoCs 704. In at least one embodiment, each of SoCs 704 may include, without limitation, central processing units ("CPU(s)") 706, graphics processing units ("GPU(s)") 708, processor(s) 710, cache(s) 712, accelerator(s) 714, data store(s) 716, and/or other components and features not illustrated. In at least one embodiment, SoC(s) 704 may be used to control vehicle 700 in a variety of platforms and systems. For example, in at least one embodiment, SoC(s) 704 may be combined in a system (e.g., system of vehicle 700) with a High Definition ("HD") map 722 which may obtain map refreshes and/or updates via network interface 724 from one or more servers (not shown in FIG. 7C).

In at least one embodiment, CPU(s) 706 may include a CPU cluster or CPU complex (alternatively referred to herein as a "CCPLEX"). In at least one embodiment, CPU(s) 706 may include multiple cores and/or level two ("L2") caches. For instance, in at least one embodiment, CPU(s) 706 may include eight cores in a coherent multi-processor configuration. In at least one embodiment, CPU(s) 706 may include four dual-core clusters where each cluster has a dedicated L2 cache (e.g., a 2 megabyte (MB) L2 cache). In at least one embodiment, CPU(s) 706 (e.g., CCPLEX) may be configured to support simultaneous cluster operations enabling any combination of clusters of CPU(s) 706 to be active at any given time.

In at least one embodiment, one or more of CPU(s) 706 may implement power management capabilities that include, without limitation, one or more of following features: individual hardware blocks may be clock-gated automatically when idle to save dynamic power, each core clock may be gated when such core is not actively executing instructions due to execution of Wait for Interrupt ("WFI")/ Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 706 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 708 may include an integrated GPU (alternatively referred to herein as an "iGPU"). In at least one embodiment, GPU(s) 708 may be programmable and may be efficient for parallel workloads. In at least one embodiment, GPU(s) 708 may use an enhanced tensor instruction set. In at least one embodiment, GPU(s) 708 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 708 may include at least eight streaming microprocessors. In at least one embodiment, GPU(s) 708 may use compute application programming interface(s) (API(s)). In at least one embodiment, GPU(s) 708 may use one or more parallel computing platforms and/or programming models (e.g., NVIDIA's CUDA model).

In at least one embodiment, one or more of GPU(s) 708 may be power-optimized for best performance in automotive and embedded use cases. For example, in at least one embodiment, GPU(s) 708 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 FP64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a scheduler (e.g., warp scheduler) or sequencer, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming micropro-cessors may include a combined L1 data cache and shared memory unit in order to improve performance while sim-plifying programming.

In at least one embodiment, one or more of GPU(s) 708 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-ac-cess memory ("SGRAM") may be used, such as a graphics double data rate type five synchronous random-access memory ("GDDR5").

In at least one embodiment, GPU(s) 708 may include unified memory technology. In at least one embodiment, address translation services ("ATS") support may be used to allow GPU(s) 708 to access CPU(s) 706 page tables directly. In at least one embodiment, embodiment, when a GPU of GPU(s) 708 memory management unit ("MMU") experi-ences a miss, an address translation request may be trans-mitted to CPU(s) 706. In response, 2 CPU of CPU(s) 706 may look in its page tables for a virtual-to-physical mapping for an address and transmit translation back to GPU(s) 708, in at least one embodiment. In at least one embodiment, unified memory technology may allow a single unified virtual address space for memory of both CPU(s) 706 and GPU(s) 708, thereby simplifying GPU(s) 708 programming and porting of applications to GPU(s) 708.

In at least one embodiment, GPU(s) 708 may include any number of access counters that may keep track of frequency of access of GPU(s) 708 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 704 may include any number of cache(s) 712, including those described herein. For example, in at least one embodiment, cache(s) 712 could include a level three ("L3") cache that is available to both CPU(s) 706 and GPU(s) 708 (e.g., that is connected to CPU(s) 706 and GPU(s) 708). In at least one embodiment, cache(s) 712 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 704 may include one or more accelerator(s) 714 (e.g., hardware accelerators, software accelerators, or a combination thereof). In at least one embodiment, SoC(s) 704 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 708 and to off-load some of tasks of GPU(s) 708 (e.g., to free up more cycles of GPU(s) 708 for performing other tasks). In at least one embodiment, accelerator(s) 714 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 714 (e.g., hardware acceleration cluster) may include one or more deep learning accelerator ("DLA"). In at least one embodi-ment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds perfor-mance of a CPU. In at least one embodiment, TPU(s) may perform several functions, including a single-instance con-volution function, supporting, for example, INT8, INT16, and FP16 data types for both features and weights, as well as post-processor functions. In at least one embodiment, DLA(s) may quickly and efficiently execute neural net-works, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 708, and by using an inference accel-erator, for example, a designer may target either DLA(s) or GPU(s) 708 for any function. For example, in at least one embodiment, a designer may focus processing of CNNs and floating point operations on DLA(s) and leave other func-tions to GPU(s) 708 and/or accelerator(s) 714.

In at least one embodiment, accelerator(s) 714 may include programmable vision accelerator ("PVA"), which may alternatively be referred to herein as a computer vision accelerator. In at least one embodiment, PVA may be designed and configured to accelerate computer vision algo-rithms for advanced driver assistance system ("ADAS") 738, autonomous driving, augmented reality ("AR") appli-cations, and/or virtual reality ("VR") applications. In at least one embodiment, PVA may provide a balance between performance and flexibility. For example, in at least one embodiment, each PVA may include, for example and with-out limitation, any number of reduced instruction set com-puter ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodi-ment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 706. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 714 may include a computer vision network on-chip and static random-access memory ("SRAM"), for providing a high-bandwidth, low latency SRAM for accelerator(s) 714. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 704 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 714 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 700, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 766 that correlates with vehicle 700 orientation, distance, 3D location estimates of object obtained from neural network and/or other sensors (e.g., LIDAR sensor(s) 764 or RADAR sensor(s) 760), among others.

In at least one embodiment, one or more of SoC(s) 704 may include data store(s) 716 (e.g., memory). In at least one embodiment, data store(s) 716 may be on-chip memory of SoC(s) 704, which may store neural networks to be executed on GPU(s) 708 and/or a DLA. In at least one embodiment, data store(s) 716 may be large enough in capacity to store multiple instances of neural networks for redundancy and safety. In at least one embodiment, data store(s) 716 may comprise L2 or L3 cache(s).

In at least one embodiment, one or more of SoC(s) 704 may include any number of processor(s) 710 (e.g., embedded processors). In at least one embodiment, processor(s) 710 may include a boot and power management processor that may be a dedicated processor and subsystem to handle boot power and management functions and related security enforcement. In at least one embodiment, a boot and power management processor may be a part of a boot sequence of SoC(s) 704 and may provide runtime power management services. In at least one embodiment, a boot power and management processor may provide clock and voltage programming, assistance in system low power state transitions, management of SoC(s) 704 thermals and temperature sensors, and/or management of SoC(s) 704 power states. In at least one embodiment, each temperature sensor may be implemented as a ring-oscillator whose output frequency is proportional to temperature, and SoC(s) 704 may use ring-oscillators to detect temperatures of CPU(s) 706, GPU(s) 708, and/or accelerator(s) 714. In at least one embodiment, if temperatures are determined to exceed a threshold, then a boot and power management processor may enter a temperature fault routine and put SoC(s) 704 into a lower power state and/or put vehicle 700 into a chauffeur to safe stop mode (e.g., bring vehicle 700 to a safe stop).

In at least one embodiment, processor(s) 710 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 710 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 710 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 710 may further include a real-time camera engine that may include, without limitation, a dedicated processor subsystem for handling real-time camera management. In at least one embodiment, processor(s) 710 may further include a high-dynamic range signal processor that may include, without limitation, an image signal processor that is a hardware engine that is part of a camera processing pipeline.

In at least one embodiment, processor(s) 710 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 770, surround camera(s) 774, and/or on in-cabin monitoring camera sensor(s). In at least one embodiment, in-cabin monitoring camera sensor(s) are preferably monitored by a neural network running on another instance of SoC 704, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 708 are not required to continuously render new surfaces. In at least one embodiment, when GPU(s) 708 are powered on and active doing 3D rendering, a video image compositor may be used to offload GPU(s) 708 to improve performance and responsiveness.

In at least one embodiment, one or more SoC of SoC(s) 704 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 704 may further include an input/output controller(s) that may be controlled by software and may be used for receiving I/O signals that are uncommitted to a specific role.

In at least one embodiment, one or more SoC of SoC(s) 704 may further include a broad range of peripheral interfaces to enable communication with peripherals, audio encoders/decoders ("codecs"), power management, and/or other devices. In at least one embodiment, SoC(s) 704 may be used to process data from cameras (e.g., connected over Gigabit Multimedia Serial Link and Ethernet channels), sensors (e.g., LIDAR sensor(s) 764, RADAR sensor(s) 760, etc. that may be connected over Ethernet channels), data from bus 702 (e.g., speed of vehicle 700, steering wheel position, etc.), data from GNSS sensor(s) 758 (e.g., connected over a Ethernet bus or a CAN bus), etc. In at least one embodiment, one or more SoC of SoC(s) 704 may further include dedicated high-performance mass storage controllers that may include their own DMA engines, and that may be used to free CPU(s) 706 from routine data management tasks.

In at least one embodiment, SoC(s) 704 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 704 may be faster, more reliable, and even more energy-efficient and space-efficient than conventional systems. For example, in at least one embodiment, accelerator(s) 714, when combined with CPU(s) 706, GPU(s) 708, and data store(s) 716, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 720) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 708.

In at least one embodiment, a CNN for facial recognition and vehicle owner identification may use data from camera sensors to identify presence of an authorized driver and/or owner of vehicle 700. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 704 provide for security against theft and/or carjacking.

In at least one embodiment, a CNN for emergency vehicle detection and identification may use data from microphones 7% to detect and identify emergency vehicle sirens. In at least one embodiment, SoC(s) 704 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 758. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 762, until emergency vehicles pass.

In at least one embodiment, vehicle 700 may include CPU(s) 718 (e.g., discrete CPU(s), or dCPU(s)), that may be coupled to SoC(s) 704 via a high-speed interconnect (e.g., PCIe). In at least one embodiment, CPU(s) 718 may include an X86 processor, for example. CPU(s) 718 may be used to perform any of a variety of functions, including arbitrating potentially inconsistent results between ADAS sensors and SoC(s) 704, and/or monitoring status and health of controller(s) 736 and/or an infotainment system on a chip ("infotainment SoC") 730, for example. In at least one embodiment, SoC(s) 704 includes one or more interconnects, and an interconnect can include a peripheral component interconnect express (PCIe).

In at least one embodiment, vehicle 700 may include GPU(s) 720 (e.g., discrete GPU(s), or dGPU(s)), that may be coupled to SoC(s) 704 via a high-speed interconnect (e.g., NVIDIA's NVLINK channel). In at least one embodiment, GPU(s) 720 may provide additional artificial intelligence functionality, such as by executing redundant and/or different neural networks, and may be used to train and/or update neural networks based at least in part on input (e.g., sensor data) from sensors of a vehicle 700.

In at least one embodiment, vehicle 700 may further include network interface 724 which may include, without limitation, wireless antenna(s) 726 (e.g., one or more wireless antennas for different communication protocols, such as a cellular antenna, a Bluetooth antenna, etc.). In at least one embodiment, network interface 724 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 700 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 700 information about vehicles in proximity to vehicle 700 (e.g., vehicles in front of, on a side of, and/or behind vehicle 700). In at least one embodiment, such aforementioned functionality may be part of a cooperative adaptive cruise control functionality of vehicle 700.

In at least one embodiment, network interface 724 may include an SoC that provides modulation and demodulation functionality and enables controller(s) 736 to communicate over wireless networks. In at least one embodiment, network interface 724 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 700 may further include data store(s) 728 which may include, without limitation, off-chip (e.g., off SoC(s) 704) storage. In at least one embodiment, data store(s) 728 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 700 may further include GNSS sensor(s) 758 (e.g., GPS and/or assisted GPS sensors), to assist in mapping, perception, occupancy grid generation, and/or path planning functions. In at least one embodiment, any number of GNSS sensor(s) 758 may be used, including, for example and without limitation, a GPS using a USB connector with an Ethernet-to-Serial (e.g., RS-232) bridge.

In at least one embodiment, vehicle 700 may further include RADAR sensor(s) 760. In at least one embodiment, RADAR sensor(s) 760 may be used by vehicle 700 for long-range vehicle detection, even in darkness and/or severe weather conditions. In at least one embodiment, RADAR functional safety levels may be ASIL B. In at least one embodiment, RADAR sensor(s) 760 may use a CAN bus and/or bus 702 (e.g., to transmit data generated by RADAR sensor(s) 760) for control and to access object tracking data, with access to Ethernet channels to access raw data in some examples. In at least one embodiment, a wide variety of RADAR sensor types may be used. For example, and without limitation, RADAR sensor(s) 760 may be suitable for front, rear, and side RADAR use. In at least one embodiment, one or more sensor of RADAR sensors(s) 760 is a Pulse Doppler RADAR sensor.

In at least one embodiment, RADAR sensor(s) 760 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 760 may help in distinguishing between static and moving objects, and may be used by ADAS system 738 for emergency brake assist and forward collision warning. In at least one embodiment, sensor(s) 760 included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 700 surroundings at higher speeds with minimal interference from traffic in adjacent lanes. In at least one embodiment, another two antennae may expand field of view, making it possible to quickly detect vehicles entering or leaving a lane of vehicle 700.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 760 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 738 for blind spot detection and/or lane change assist.

In at least one embodiment, vehicle 700 may further include ultrasonic sensor(s) 762. In at least one embodiment, ultrasonic sensor(s) 762, which may be positioned at a front, a back, and/or side location of vehicle 700, may be used for parking assist and/or to create and update an occupancy grid. In at least one embodiment, a wide variety of ultrasonic sensor(s) 762 may be used, and different ultrasonic sensor(s) 762 may be used for different ranges of detection (e.g., 2.5 m, 4 m). In at least one embodiment, ultrasonic sensor(s) 762 may operate at functional safety levels of ASIL B.

In at least one embodiment, vehicle 700 may include LIDAR sensor(s) 764. In at least one embodiment, LIDAR sensor(s) 764 may be used for object and pedestrian detection, emergency braking, collision avoidance, and/or other functions. In at least one embodiment, LIDAR sensor(s) 764 may operate at functional safety level ASIL B. In at least one embodiment, vehicle 700 may include multiple LIDAR sensors 764 (e.g., two, four, six, etc.) that may use an Ethernet channel (e.g., to provide data to a Gigabit Ethernet switch).

In at least one embodiment, LIDAR sensor(s) 764 may be capable of providing a list of objects and their distances for a 360-degree field of view. In at least one embodiment, commercially available LIDAR sensor(s) 764 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 764 may include a small device that may be embedded into a front, a rear, a side, and/or a corner location of vehicle 700. In at least one embodiment, LIDAR sensor(s) 764, in such an embodiment, may provide up to a 120-degree horizontal and 35-degree vertical field-of-view, with a 200 m range even for low-reflectivity objects. In at least one embodiment, front-mounted LIDAR sensor(s) 764 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 700 up to approximately 200 m. In at least one embodiment, a flash LIDAR unit includes, without limitation, a receptor, which records laser pulse transit time and reflected light on each pixel, which in turn corresponds to a range from vehicle 700 to objects. In at least one embodiment, flash LIDAR may allow for highly accurate and distortion-free images of surroundings to be generated with every laser flash. In at least one embodiment, four flash LIDAR sensors may be deployed, one at each side of vehicle 700. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 700 may further include IMU sensor(s) 766. In at least one embodiment, IMU sensor(s) 766 may be located at a center of a rear axle of vehicle 700. In at least one embodiment, IMU sensor(s) 766 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 766 may include, without limitation, accelerometers and gyroscopes. In at least one embodiment, such as in nine-axis applications, IMU sensor(s) 766 may include, without limitation, accelerometers, gyroscopes, and magnetometers.

In at least one embodiment, IMU sensor(s) 766 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 766 may enable vehicle 700 to estimate its heading without requiring input from a magnetic sensor by directly observing and correlating changes in velocity from a GPS to IMU sensor(s) 766. In at least one embodiment, IMU sensor(s) 766 and GNSS sensor(s) 758 may be combined in a single integrated unit.

In at least one embodiment, vehicle 700 may include microphone(s) 7% placed in and/or around vehicle 700. In at least one embodiment, microphone(s) 7% may be used for emergency vehicle detection and identification, among other things.

In at least one embodiment, vehicle 700 may further include any number of camera types, including stereo camera(s) 768, wide-view camera(s) 770, infrared camera(s) 772, surround camera(s) 774, long-range camera(s) 798, mid-range camera(s) 776, and/or other camera types. In at least one embodiment, cameras may be used to capture image data around an entire periphery of vehicle 700. In at least one embodiment, which types of cameras used depends on vehicle 700. In at least one embodiment, any combination of camera types may be used to provide necessary coverage around vehicle 700. In at least one embodiment, a number of cameras deployed may differ depending on embodiment. For example, in at least one embodiment, vehicle 700 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 7A and FIG. 7B.

In at least one embodiment, vehicle 700 may further include vibration sensor(s) 742. In at least one embodiment, vibration sensor(s) 742 may measure vibrations of components of vehicle 700, such as axle(s). For example, in at least one embodiment, changes in vibrations may indicate a change in road surfaces. In at least one embodiment, when two or more vibration sensors 742 are used, differences between vibrations may be used to determine friction or slippage of road surface (e.g., when a difference in vibration is between a power-driven axle and a freely rotating axle).

In at least one embodiment, vehicle 700 may include ADAS system 738. In at least one embodiment, ADAS system 738 may include, without limitation, an SoC, in some examples. In at least one embodiment, ADAS system 738 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 760, LIDAR sensor(s) 764, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 700 and automatically adjusts speed of vehicle 700 to maintain a safe distance from vehicles ahead. In at least one embodiment, a lateral ACC system performs distance keeping, and advises vehicle 700 to change lanes when necessary. In at least one embodiment, a lateral ACC is related to other ADAS applications, such as LC and CW.

In at least one embodiment, a CACC system uses information from other vehicles that may be received via network interface 724 and/or wireless antenna(s) 726 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 700), while I2V communication provides information about traffic further ahead. In at least one embodiment, a CACC system may include either or both I2V and V2V information sources. In at least one embodiment, given information of vehicles ahead of vehicle 700, a CACC system may be more reliable and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 760, coupled to a dedicated processor, DSP, FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, AEB system may use front-facing camera(s) and/or RADAR sensor(s) 760, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 700 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 700 if vehicle 700 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 700 is backing up. In at least one embodiment, an RCTW system includes an AEB system to ensure that vehicle brakes are applied to avoid a crash. In at least one embodiment, an RCTW system may use one or more rear-facing RADAR sensor(s) 760, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 700 itself decides, in case of conflicting results, whether to heed result from a primary computer or a secondary computer (e.g., a first controller or a second controller of controllers 736). For example, in at least one embodiment, ADAS system 738 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 738 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 704.

In at least one embodiment, ADAS system 738 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 738 may be fed into a primary computer's perception block and/or a primary computer's dynamic driving task block. For example, in at least one embodiment, if ADAS system 738 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 700 may further include infotainment SoC 730 (e.g., an in-vehicle infotainment system (IVI)). Although illustrated and described as an SoC, infotainment system SoC 730, in at least one embodiment, may not be an SoC, and may include, without limitation, two or more discrete components. In at least one embodiment, infotainment SoC 730 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 700. For example, infotainment SoC 730 could include radios, disk players, navigation systems, video players, USB and Bluetooth connectivity, carputers, in-car entertainment, WiFi, steering wheel audio controls, hands free voice control, a heads-up display ("HUD"), HNI display 734, a telematics device, a control panel (e.g., for controlling and/or interacting with various components, features, and/or systems), and/or other components. In at least one embodiment, infotainment SoC 730 may further be used to provide information (e.g., visual and/or audible) to user(s) of vehicle 700, such as information from ADAS system 738, autonomous driving information such as planned vehicle maneuvers, trajectories, surrounding environment information (e.g., intersection information, vehicle information, road information, etc.), and/or other information.

In at least one embodiment, infotainment SoC 730 may include any amount and type of GPU functionality. In at least one embodiment, infotainment SoC 730 may communicate over bus 702 with other devices, systems, and/or components of vehicle 700. In at least one embodiment, infotainment SoC 730 may be coupled to a supervisory MCU such that a GPU of an infotainment system may perform some self-driving functions in event that primary controller(s) 736 (e.g., primary and/or backup computers of vehicle 700) fail. In at least one embodiment, infotainment SoC 730 may put vehicle 700 into a chauffeur to safe stop mode, as described herein.

In at least one embodiment, vehicle 700 may further include instrument cluster 732 (e.g., a digital dash, an electronic instrument cluster, a digital instrument panel, etc.). In at least one embodiment, instrument cluster 732 may include, without limitation, a controller and/or supercomputer (e.g., a discrete controller or supercomputer). In at least one embodiment, instrument cluster 732 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 730 and instrument cluster 732. In at least one embodiment, instrument cluster 732 may be included as part of infotainment SoC 730, or vice versa.

Figure 7D:
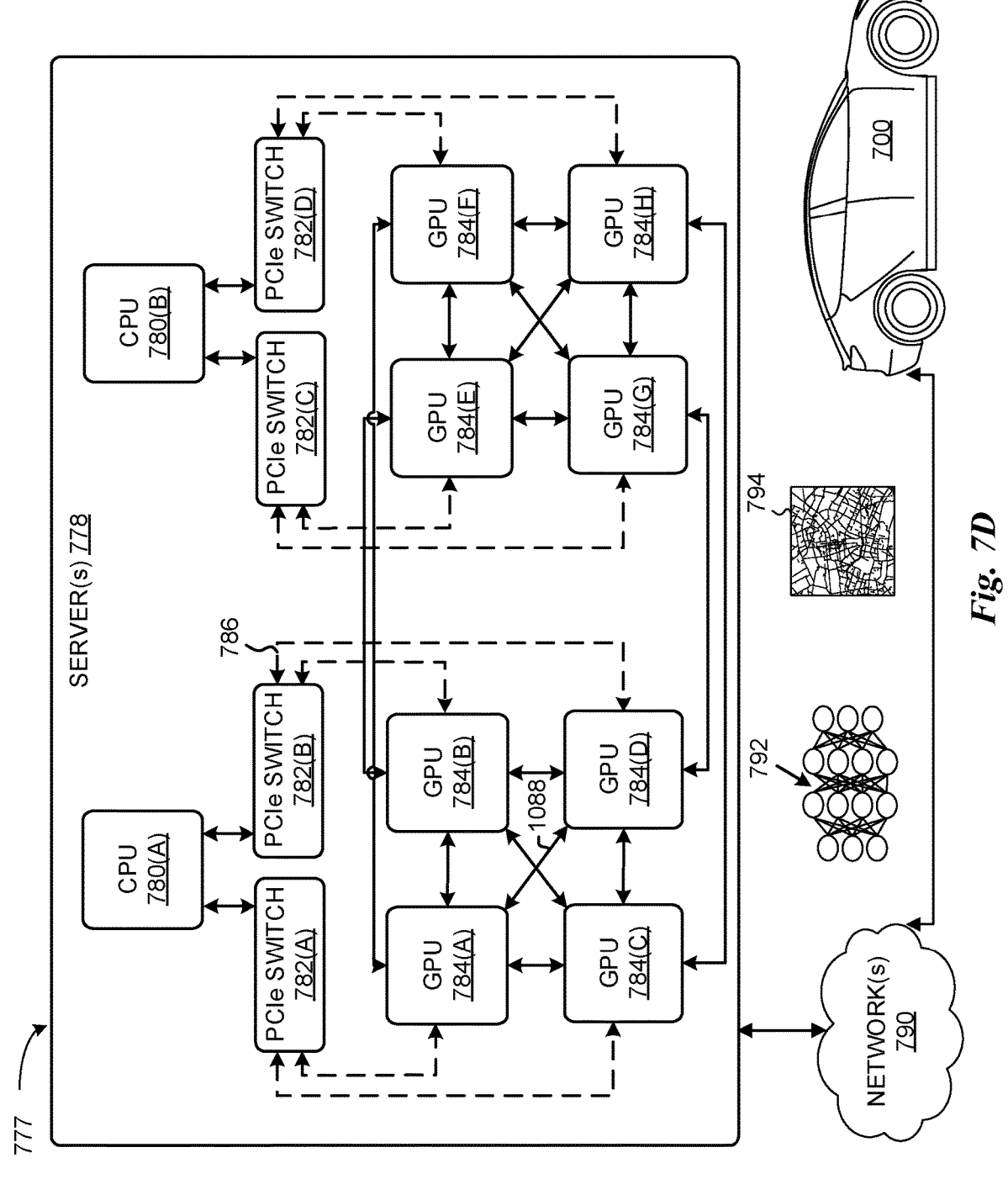
FIG. 7D is a diagram illustrating a system for communication between cloud-based server(s) and the autonomous vehicle of FIG. 7A, according to at least one embodiment.

FIG. 7D is a diagram of a system for communication between cloud-based server(s) and autonomous vehicle 700 of FIG. 7A, according to at least one embodiment. In at least one embodiment, system may include, without limitation, server(s) 778, network(s) 790, and any number and type of vehicles, including vehicle 700. In at least one embodiment, server(s) 778 may include, without limitation, a plurality of GPUs 784(A)-784(H) (collectively referred to herein as GPUs 784), PCIe switches 782(A)-782(D) (collectively referred to herein as PCIe switches 782), and/or CPUs 780(A)-780(B) (collectively referred to herein as CPUs 780). In at least one embodiment, GPUs 784, CPUs 780, and PCIe switches 782 may be interconnected with high-speed interconnects such as, for example and without limitation, NVLink interfaces 788 developed by NVIDIA and/or PCIe connections 786. In at least one embodiment, GPUs 784 are connected via an NVLink and/or NVSwitch SoC and GPUs 784 and PCIe switches 782 are connected via PCIe interconnects. Although eight GPUs 784, two CPUs 780, and four PCIe switches 782 are illustrated, this is not intended to be limiting. In at least one embodiment, each of server(s) 778 may include, without limitation, any number of GPUs 784, CPUs 780, and/or PCIe switches 782, in any combination. For example, in at least one embodiment, server(s) 778 could each include eight, sixteen, thirty-two, and/or more GPUs 784.

In at least one embodiment, server(s) 778 may receive, over network(s) 790 and from vehicles, image data representative of images showing unexpected or changed road conditions, such as recently commenced road-work. In at least one embodiment, server(s) 778 may transmit, over network(s) 790 and to vehicles, neural networks 792, updated or otherwise, and/or map information 794, including, without limitation, information regarding traffic and road conditions. In at least one embodiment, updates to map information 794 may include, without limitation, updates for HD map 722, such as information regarding construction sites, potholes, detours, flooding, and/or other obstructions. In at least one embodiment, neural networks 792, and/or map information 794 may have resulted from new training and/or experiences represented in data received from any number of vehicles in an environment, and/or based at least in part on training performed at a data center (e.g., using server(s) 778 and/or other servers).

In at least one embodiment, server(s) 778 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 790), and/or machine learning models may be used by server(s) 778 to remotely monitor vehicles.

In at least one embodiment, server(s) 778 may receive data from vehicles and apply data to up-to-date real-time neural networks for real-time intelligent inferencing. In at least one embodiment, server(s) 778 may include deep-learning supercomputers and/or dedicated AI computers powered by GPU(s) 784, such as a DGX and DGX Station machines developed by NVIDIA. However, in at least one embodiment, server(s) 778 may include deep learning infrastructure that uses CPU-powered data centers.

In at least one embodiment, deep-learning infrastructure of server(s) 778 may be capable of fast, real-time inferencing, and may use that capability to evaluate and verify health of processors, software, and/or associated hardware in vehicle 700. For example, in at least one embodiment, deep-learning infrastructure may receive periodic updates from vehicle 700, such as a sequence of images and/or objects that vehicle 700 has located in that sequence of images (e.g., via computer vision and/or other machine learning object classification techniques). In at least one embodiment, deep-learning infrastructure may run its own neural network to identify objects and compare them with objects identified by vehicle 700 and, if results do not match and deep-learning infrastructure concludes that AI in vehicle 700 is malfunctioning, then server(s) 778 may transmit a signal to vehicle 700 instructing a fail-safe computer of vehicle 700 to assume control, notify passengers, and complete a safe parking maneuver.

In at least one embodiment, server(s) 778 may include GPU(s) 784 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached FIGS. are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   receiving one or more input images, wherein each image of the one or more input images is a two-dimensional (2D) image of a scene; and
   processing, via a plurality of models implemented by one or more processors, the one or more input images to generate three-dimensional (3D) semantic information for the scene, the processing comprising:
   extracting a set of image feature maps from the one or more input images by at least one feature extraction network,
   generating a depth map by processing the one or more input images by a depth estimation network,
   generating 3D point cloud data based on the depth map,
   generating a first binary voxel grid occupancy map at a first resolution based on the 3D point cloud,
   converting the first binary voxel grid occupancy map at the first resolution to a second binary voxel grid occupancy map at a second resolution by a depth correction network, and
   generating the three-dimensional semantic information based on the set of image feature maps by using at least one transformer.

2. The method of claim 1, wherein the processing, via the plurality of models implemented by the one or more processors, the one or more input images to generate the three-dimensional semantic information for the scene further comprises:

generating, via a query proposal network, a set of query proposals by processing at least one of the depth map or the second binary voxel grid occupancy map.

3. The method of claim 1, wherein the at least one feature extraction network is a convolutional neural network (CNN).

4. The method of claim 2, wherein the generating the three-dimensional semantic information based on the set of image feature maps by using the at least one transformer comprises:

processing, via a first transformer, the set of image feature maps using a deformable cross-attention (DCA) mechanism in accordance with the set of query proposals to generate an updated set of query proposals.

5. The method of claim 4, wherein the generating the three-dimensional semantic information based on the set of image feature maps by using the at least one transformer comprises:

generating initial voxel features by combining the updated set of query proposals with a mask token; and processing, via a second transformer, the initial voxel features using a deformable self-attention (DSA) mechanism to generate refined voxel features.

6. The method of claim 5, wherein the generating the three-dimensional semantic information based on the set of image feature maps by using the at least one transformer comprises:

up-sampling the refined voxel features; and processing the up-sampled refined voxel features via a neural network comprising one or more fully connected layers to generate the three-dimensional semantic information.

7. The method of claim 1, wherein the plurality of models are trained in accordance with a loss criteria as defined by:

$$\mathcal{L} = -\Sigma_{k=1}^{K} \Sigma_{c=c_0}^{c_m} \boldsymbol{w}_c \hat{y}_{k,c} \log\left(\frac{e^{y_{k,c}}}{\Sigma_c e^{y_{k,c}}}\right),$$

where k is a voxel index, K is a total number of the voxels, c indexes a plurality of semantic classes, $y_{k,c}$ is a predicted logits for the k-th voxel belonging to class c, $\hat{y}_{k,c}$ is a k-th element of $\hat{Y}_t$; and $w_c$ is a weight for each class according to an inverse of a class frequency.

8. The method of claim 1, further comprising:

capturing, via an image sensor, the one or more input images.

9. The method of claim 7, wherein the image sensor is integrated in an autonomous vehicle, the method further comprising:

performing at least one advanced driver assistance systems (ADAS) function based on the three-dimensional semantic information, wherein the at least one ADAS function includes one or more of the following:

emergency braking;

pedestrian detection;

collision avoidance;

route planning;

lane departure warning; or object avoidance.

10. The method of claim 1, wherein the at least one feature extraction network includes a convolutional neural network (CNN) configured to process the one or more images to generate the set of image feature maps, and wherein the at least one transformer includes a first transformer configured to implement a deformable cross-attention mechanism and a second transformer configured to implement a deformable self-attention mechanism.

11. A system, comprising:

a memory storing one or more input images, wherein each image of the one or more input images is a two-dimensional (2D) image of a scene; and one or more processors, connected to the memory, to:

process, via a plurality of models, the one or more input images to generate three-dimensional (3D) semantic information for the scene, by:

extracting a set of image feature maps from the one or more input images by at least one feature extraction network, generating a depth map by processing the one or more input images by a depth estimation network, generating 3D point cloud data based on the depth map, generating a first binary voxel grid occupancy map at a first resolution based on the 3D point cloud, converting the first binary voxel grid occupancy map at the first resolution to a second binary voxel grid occupancy map at a second resolution by a depth correction network, and generating the three-dimensional semantic information based on the set of image feature maps by at least one transformer.

12. The system of claim 11, wherein the processing, via the plurality of models, the one or more input images to generate the 3D semantic information comprises:

generating, via a query proposal network, a set of query proposals by processing at least one of the depth map or the second binary voxel grid occupancy map.

13. The system of claim 12, wherein the processing, via the plurality of models, the one or more input images to generate the 3D semantic information comprises:

processing, via a first transformer, the set of image feature maps using a deformable cross-attention (DCA) mechanism in accordance with the set of query proposals to generate an updated set of query proposals;

generating initial voxel features by combining the updated set of query proposals with a mask token;

processing, via a second transformer, the initial voxel features using a deformable self-attention (DSA) mechanism to generate refined voxel features;

up-sampling the refined voxel features; and processing the up-sampled refined voxel features via a neural network comprising one or more fully connected layers to generate the three-dimensional semantic information.

14. The system of claim 11, wherein the plurality of models are trained in accordance with a loss criteria as defined by:

$$\mathcal{L} = -\Sigma_{k=1}^{K} \Sigma_{c=c_0}^{c_m} \boldsymbol{w}_c \hat{y}_{k,c} \log\left(\frac{e^{y_{k,c}}}{\Sigma_c e^{y_{k,c}}}\right),$$

where k is a voxel index, K is a total number of the voxels, c indexes a plurality of semantic classes, $y_{k,c}$ is a predicted logits for the k-th voxel belonging to class c, $\hat{y}_{k,c}$ is a k-th element of $\hat{Y}t$; and $w_c$ is a weight for each class according to an inverse of a class frequency.

15. The system of claim 11, further comprising:

an image sensor, wherein the one or more input images are captured by the image sensor.

16. The system of claim 15, wherein the system comprises an autonomous vehicle, and wherein the autonomous vehicle performs at least one advanced driver assistance systems (ADAS) function based on the three-dimensional semantic information, wherein the at least one ADAS functions includes one or more of the following:

emergency braking;

pedestrian detection;

collision avoidance;

route planning;

lane departure warning; or object avoidance.

17. A non-transitory computer-readable media storing computer instructions that, responsive to being executed by one or more processors, cause a device to perform the steps of:

receiving one or more input images, wherein each image of the one or more input images is a two-dimensional (2D) image of a scene; and processing, via a plurality of models implemented by one or more processors, the one or more input images to generate three-dimensional (3D) semantic information for the scene, the processing comprising:

extracting a set of image feature maps from the one or more input images by at least one feature extraction network, generating a depth map by processing the one or more input images by a depth estimation network, generating 3D point cloud data based on the depth map, generating a first binary voxel grid occupancy map at a first resolution based on the 3D point cloud, converting the first binary voxel grid occupancy map at the first resolution to a second binary voxel grid occupancy map at a second resolution by a depth correction network, and generating the three-dimensional semantic information based on the set of image feature maps by at least one transformer.

18. The non-transitory computer-readable media of claim 17, wherein the processing, via the plurality of models implemented by the one or more processors, the one or more input images to generate the 3D semantic information comprises:

generating, via a query proposal network, a set of query proposals by processing at least one of the depth map or the second binary voxel grid occupancy map;

processing, via a first transformer, the set of image features using a deformable cross-attention (DCA) mechanism in accordance with the set of query proposals to generate an updated set of query proposals;

generating initial voxel features by combining the updated set of query proposals with a mask token;

processing, via a second transformer, the initial voxel features using a deformable self-attention (DSA) mechanism to generate refined voxel features;

up-sampling the refined voxel features; and processing the up-sampled refined voxel features via a neural network comprising one or more fully connected layers to generate the three-dimensional semantic information.

\* \* \* \* \*